United States Patent
Adachi

(10) Patent No.: US 10,623,715 B2
(45) Date of Patent: Apr. 14, 2020

(54) INFORMATION PROCESSING APPARATUS AND CONTROL METHOD THEREFOR

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/202,472

(22) Filed: Nov. 28, 2018

(65) Prior Publication Data

US 2019/0174112 A1 Jun. 6, 2019

(30) Foreign Application Priority Data

Dec. 6, 2017 (JP) .................... 2017-234302

(51) Int. Cl.
| | |
|---|---|
| *H04N 13/161* | (2018.01) |
| *H04N 13/111* | (2018.01) |
| *H04N 5/247* | (2006.01) |
| *H04N 13/139* | (2018.01) |
| *H04N 5/232* | (2006.01) |
| *H04N 21/218* | (2011.01) |
| *H04N 21/234* | (2011.01) |
| *H04N 5/04* | (2006.01) |

(52) U.S. Cl.
CPC .......... *H04N 13/161* (2018.05); *H04N 5/232* (2013.01); *H04N 5/247* (2013.01); *H04N 13/111* (2018.05); *H04N 13/139* (2018.05); *H04N 21/21805* (2013.01); *H04N 21/234* (2013.01); *H04N 5/04* (2013.01)

(58) Field of Classification Search
CPC .. H04N 13/161; H04N 13/139; H04N 13/111; H04N 5/247; H04N 5/04
USPC ......................................................... 348/441
See application file for complete search history.

(56) References Cited

U.S. PATENT DOCUMENTS

| | | | |
|---|---|---|---|
| 7,106,361 B2 * | 9/2006 | Kanade | .................. G03B 41/00 348/143 |
| 2003/0231179 A1 * | 12/2003 | Suzuki | ................... G06T 17/10 345/423 |
| 2004/0201587 A1 * | 10/2004 | Mizusawa | .............. G06T 15/20 345/427 |
| 2010/0329358 A1 * | 12/2010 | Zhang | ................. H04N 19/597 375/240.26 |
| 2012/0262954 A1 * | 10/2012 | Duvnjak | ............ H02M 1/4258 363/21.02 |

(Continued)

*Primary Examiner* — Michael Lee
(74) *Attorney, Agent, or Firm* — Rossi, Kimms & McDowell LLP

(57) ABSTRACT

An information processing apparatus, which transmits, to an image processing apparatus for generating a virtual viewpoint image, at least some of a plurality of images based on image capturing from a plurality of different directions, obtains an image based on image capturing by an image capturing apparatus, obtains camera viewpoint information about at least one of a position and orientation of the image capturing apparatus, obtains virtual viewpoint information about at least one of a position and orientation of the virtual viewpoint, reduces an information amount of the obtained image based on the camera viewpoint information and the virtual viewpoint information, and transmits the image with the reduced information amount to the image processing apparatus.

13 Claims, 16 Drawing Sheets

(56) References Cited

U.S. PATENT DOCUMENTS

2015/0341621 A1* 11/2015 Aagaard ................ H04N 7/181
                                                    348/47
2017/0019605 A1*  1/2017 Ahiska .................. H04N 5/217
2017/0162973 A1*  6/2017 Norton ................. H04L 12/6418
2017/0280133 A1*  9/2017 Niemela .............. H04N 13/156

* cited by examiner

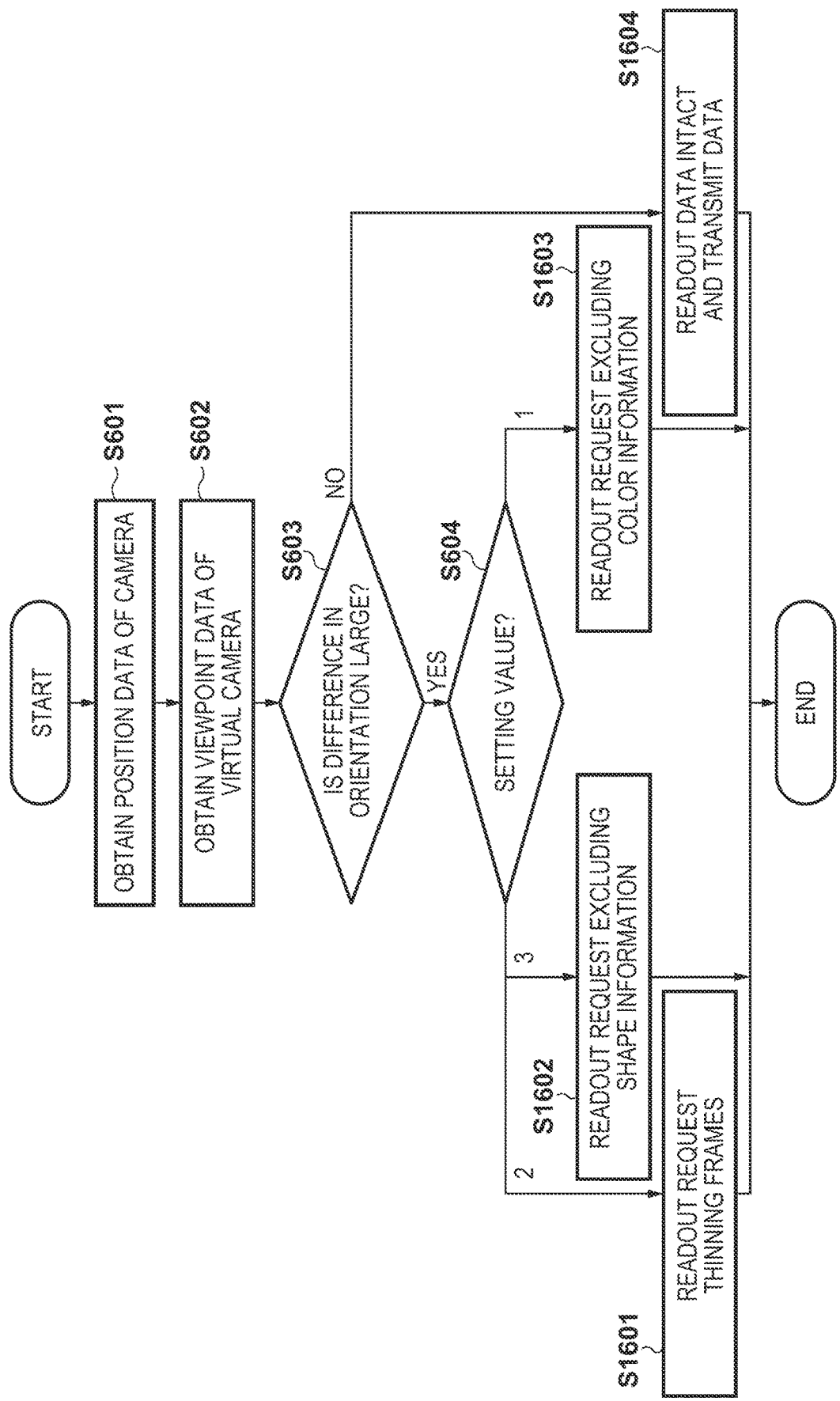

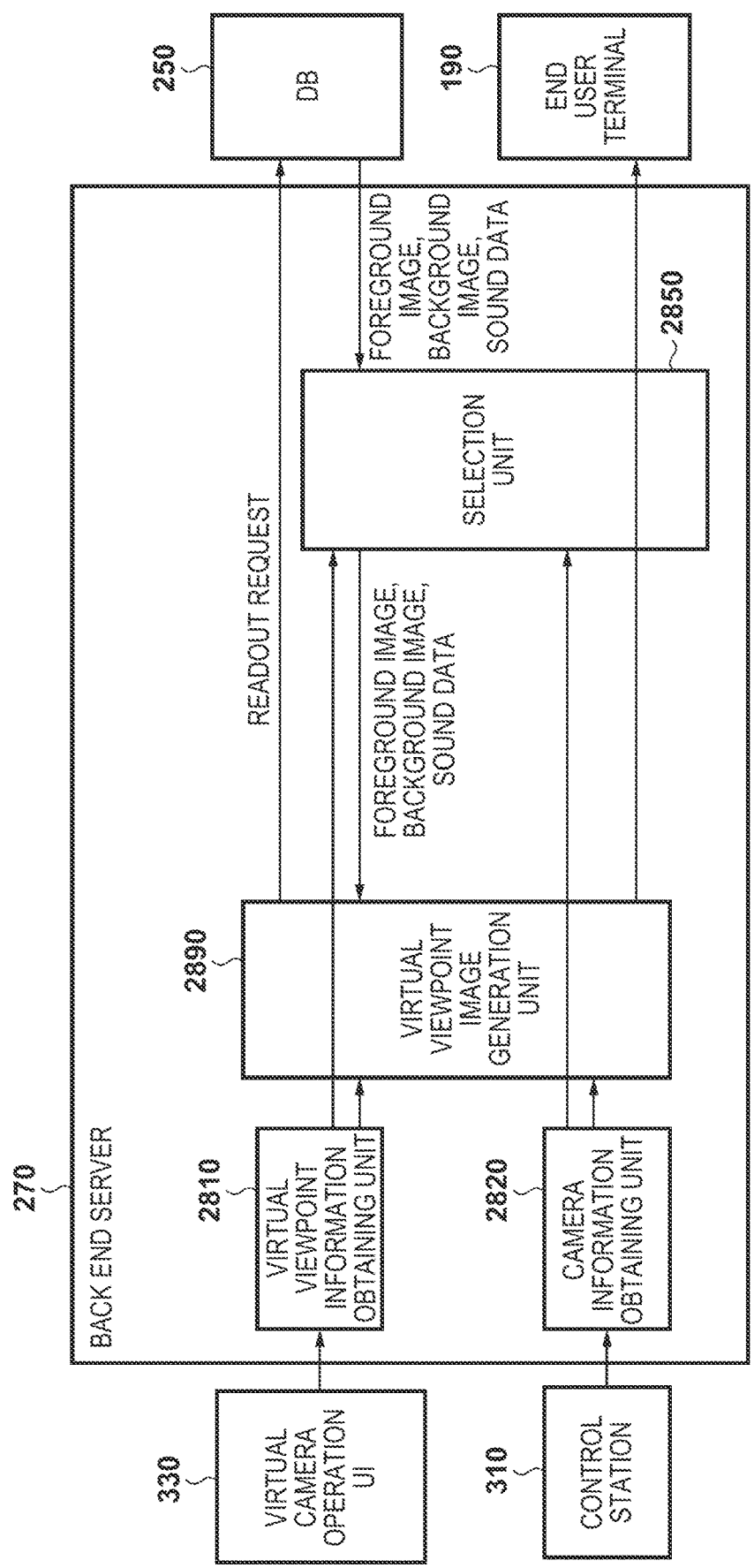

INFORMATION PROCESSING APPARATUS AND CONTROL METHOD THEREFOR

BACKGROUND OF THE INVENTION

Field of the Invention

The present invention relates to a technique of transmitting captured images from a plurality of cameras to capture an object from a plurality of directions.

Description of the Related Art

In these days, a technique of performing synchronous image capturing at multi-viewpoints using a plurality of cameras placed at different positions and generating a virtual viewpoint content using a plurality of captured images (a plurality of viewpoint images) obtained by the image capturing has received attention. According to this technique, for example, highlight scenes of a soccer or basketball game can be viewed from various angles. This can give a user a realistic feeling as compared to normal images.

Generation and browsing of the virtual viewpoint content based on the plurality of viewpoint images can be implemented by collecting images captured by the plurality of cameras to an image processing unit such as a server and causing the image processing unit to execute processing such as 3D model generation and rendering and transmit the images to a user terminal.

U.S. Pat. No. 7,106,361 describes a technique of connecting, by optical fibers, a plurality of cameras via control units respectively paired with the cameras, accumulating image frames of each camera in the corresponding control unit, and performing image output to express a continuous motion using the accumulated image frames.

In an image processing system that generates a virtual viewpoint image from a plurality of captured images, a plurality of images based on image capturing by a plurality of cameras are transmitted in the system. If it is impossible to ensure an enough communication band corresponding to the data amounts of the plurality of images to be transmitted, generation of a virtual viewpoint image may be delayed or it may be impossible to generate a virtual viewpoint image.

On the other hand, if compression processing and the like are performed uniformly for the images to be transmitted in order to reduce the data amounts of the images to be transmitted, the quality of a virtual viewpoint image to be generated may largely degrade.

SUMMARY OF THE INVENTION

An embodiment of the present invention provides an information processing apparatus capable of suppressing degradation in quality of a virtual viewpoint image to be generated and also reducing a data amount to be transmitted in a system for generating the virtual viewpoint image.

According to one aspect of the present invention, there is provided an information processing apparatus that transmits, to an image processing apparatus for generating a virtual viewpoint image, at least some of a plurality of images based on image capturing from a plurality of different directions, the apparatus comprising: an image obtaining unit configured to obtain an image based on image capturing by an image capturing apparatus; a first obtaining unit configured to obtain camera viewpoint information about at least one of a position and orientation of the image capturing apparatus; a second obtaining unit configured to obtain virtual viewpoint information about at least one of a position and orientation of the virtual viewpoint; a reduction unit configured to reduce an information amount of the obtained image based on the camera viewpoint information and the virtual viewpoint information; and a transmission unit configured to transmit the image with the reduced information amount to the image processing apparatus.

According to another aspect of the present invention, there is provided an information processing apparatus comprising: a first obtaining unit configured to obtain information about at least one of a position and orientation of each of a plurality of image capturing apparatuses that capture an object from a plurality of different directions; a second obtaining unit configured to obtain information about at least one of a position and orientation of a virtual viewpoint; a reduction unit configured to reduce, based on information about at least one of the position and orientation of each of the plurality of image capturing apparatuses and at least one of the position and orientation of the virtual viewpoint, an information amount of a captured image selected from captured images of the plurality of image capturing apparatuses; and a control unit configured to control to store, in a memory, the captured image with the information amount reduced by the reduction unit.

According to another aspect of the present invention, there is provided a control method for an information processing apparatus that transmits, to an image processing apparatus for generating a virtual viewpoint image, at least some of a plurality of images based on image capturing from a plurality of different directions, the method comprising: obtaining an image based on image capturing by an image capturing apparatus; obtaining camera viewpoint information about at least one of a position and orientation of the image capturing apparatus; obtaining virtual viewpoint information about at least one of a position and orientation of the virtual viewpoint; reducing an information amount of the obtained image based on the camera viewpoint information and the virtual viewpoint information; and transmitting the image with the reduced information amount to the image processing apparatus.

According to another aspect of the present invention, there is provided a control method for an information processing apparatus, comprising: obtaining information about at least one of a position and orientation of each of a plurality of image capturing apparatuses that capture an object from a plurality of different directions; obtaining information about at least one of a position and orientation of a virtual viewpoint; reducing an information amount of a captured image selected from captured images of the plurality of image capturing apparatuses based on information about at least one of the position and orientation of each of the plurality of image capturing apparatuses and at least one of the position and orientation of the virtual viewpoint; and writing, in a storage device, the captured image with the reduced information amount.

Further features of the present invention will become apparent from the following description of exemplary embodiments (with reference to the attached drawings).

BRIEF DESCRIPTION OF THE DRAWINGS

FIG. 16 is a flowchart illustrating the procedure of readout data designation processing of a selecting unit 2750; and FIG. 17 is a block diagram showing an example of the arrangement of a back end server 270 according to the seventh embodiment.

DESCRIPTION OF THE EMBODIMENTS

Embodiments according to the present invention will be described in detail below with reference to the drawings. Arrangements described in the following embodiments are merely examples, and the present invention is not limited to the illustrated arrangements.

First Embodiment

As a premise of the first embodiment, an example of a virtual viewpoint content generation system that performs image capturing and sound collection using a plurality of cameras and microphones placed in a facility such as an arena (stadium) or a concert hall will be described with reference to FIG. 1.

Figure 1:
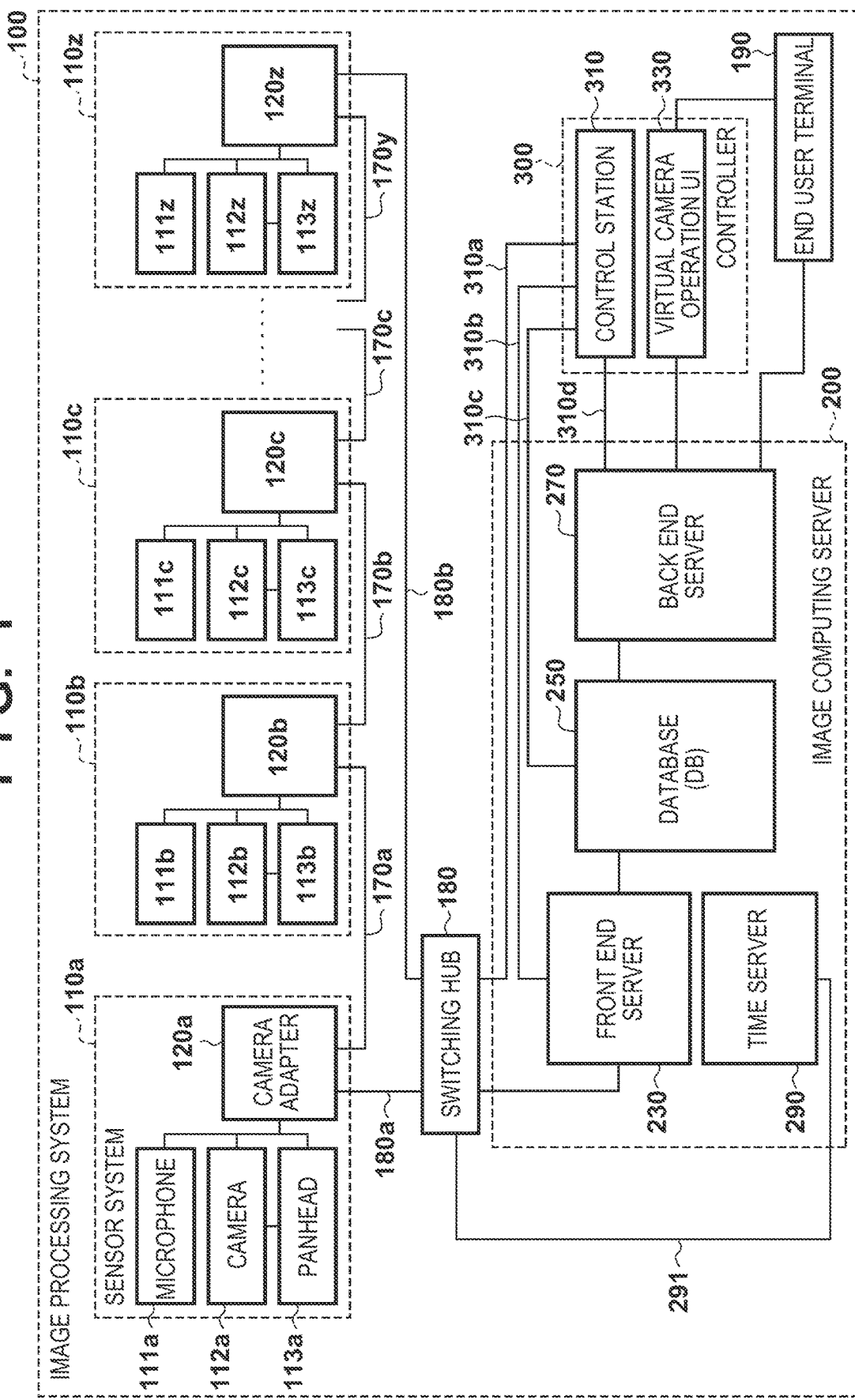
FIG. 1 is a block diagram showing an example of the arrangement of an image processing system 100 according to the first embodiment.

FIG. 1 is a block diagram showing an example of the arrangement of an image processing system 100 according to the first embodiment. Referring to FIG. 1, the image processing system 100 includes sensor systems 110a to 110z, an image computing server 200, a controller 300, a switching hub 180, and an end user terminal 190.

An operation of transmitting images and sounds obtained by the 26 sensor systems 110a to 110z from the sensor system 110z to the image computing server 200 will be described.

In the image processing system 100, the sensor systems 110a to 110z are connected by daisy chains. The 26 systems, that is, the sensor systems 110a to 110z will be expressed as sensor systems 110 without distinction unless specifically stated otherwise. Similarly, devices in each sensor system 110 will be described as a microphone 111, a camera 112, a panhead 113, and a camera adapter 120 without distinction unless specifically stated otherwise. Note that in this embodiment, the number of sensor systems is 26. However, the number of sensor systems is merely an example and is not limited to this. Note that a term "image" includes the concepts of both a moving image and a still image unless specifically stated otherwise. That is, the image processing system 100 can process both a still image and a moving image.

In this embodiment, an example in which a virtual viewpoint content provided by the image processing system 100 includes both a virtual viewpoint image and a virtual viewpoint sound (a virtual hearing point sound) will mainly be described. However, the present invention is not limited to this. For example, the virtual viewpoint content need not include a sound. Additionally, for example, the sound included in the virtual viewpoint content may be a sound collected by a microphone closest to the virtual viewpoint. In this embodiment, a description of a sound will partially be omitted for the sake of descriptive simplicity. Basically, an image and a sound are processed together.

The sensor systems 110a to 110z include single cameras 112a to 112z, respectively. That is, the image processing system 100 includes a plurality of image capturing apparatuses to capture one object from a plurality of directions. The plurality of sensor systems 110 are connected by daisy chains.

Note that the present invention is not limited to this, and a star network in which the sensor systems 110a to 110z are connected to the switching hub 180 and data transmission/reception among the sensor systems 110 is performed via the switching hub 180 may be used as a connection form.

FIG. 1 shows an arrangement in which all the sensor systems 110a to 110z are cascade-connected so as to form a daisy chain. However, the present invention is not limited to this. For example, the plurality of sensor systems 110 may be divided into some groups, and the sensor systems 110 may be connected by a daisy chain in each divided group. The camera adapter 120 at the end of a division unit may be connected to the switching hub to input an image to the image computing server 200. This arrangement is particularly effective in a stadium. For example, a case in which a stadium includes a plurality of floors, and the sensor system 110 is disposed in each floor can be considered. In this case, images can be input to the image computing server 200 in every floor or every half round of the stadium. Even in a place where wiring to connect all the sensor systems 110 by one daisy chain is difficult, the placement can be simplified and the system can be made versatile.

Control of image processing in the image computing server 200 is switched depending on whether one camera adapter 120 or two or more camera adapters 120 are connected by a daisy chain to input images to the image computing server 200. That is, control is switched depending on whether the sensor systems 110 are divided into a plurality of groups. In a case in which one camera adapter 120 inputs images, an all-round image of the arena is generated while transmitting images through the daisy chain connection. Therefore, the timings that all-round image data are completely collected in the image computing server 200 are synchronized. That is, the timings can be synchronized unless the sensor systems 110 are divided into groups.

The sensor system 110 includes the microphone 111, the camera 112, the panhead 113, and the camera adapter 120. However, the sensor system 110 is not limited to this. The sensor system 110 need only include at least one camera adapter 120 and one camera 112 or one microphone 111. For example, the sensor system 110 may be formed by one camera adapter 120 and a plurality of cameras 112, or may be formed by one camera 112 and a plurality of camera adapters 120. That is, the plurality of cameras 112 and the plurality of camera adapters 120 in the image processing system 100 are in an N-to-M (N and M are integers of 1 or more) correspondence. The sensor system 110 may include devices other than the microphone 111, the camera 112, the panhead 113, and the camera adapter 120. The camera 112 and the camera adapter 120 may be integrated. At least some functions of the camera adapter 120 may be imparted to a front end server 230. In this embodiment, the sensor systems 110b to 110z have the same arrangement as that of the sensory system 110a and a description thereof will be omitted. Note that all the sensor systems 110 need not have the same arrangement, and may have different arrangements.

A sound collected by the microphone 111a and an image captured by the camera 112a undergo image processing (to be described later) by the camera adapter 120a and are then transmitted to the camera adapter 120b of the sensor system 110b via a daisy chain 170a. Similarly, the sensor system 110b transmits a collected sound and a captured image to the sensor system 110c together with the image and the sound obtained from the sensor system 110a.

By continuing the above-described operation, the images and sounds obtained by the sensor systems 110a to 110z are transmitted from the sensor system 110z to the switching hub 180 using a network 180b, and then transmitted to the image computing server 200.

Note that in this embodiment, the cameras 112a to 112z are separated from the camera adapters 120a to 120z. However, the cameras and the camera adapters may be integrated in a single housing. In this case, the microphones 111a to 111z may be incorporated in the integrated camera 112 or may be connected to the outside of the camera 112.

The arrangement and operation of the image computing server 200 will be described next. The image computing server 200 according to this embodiment processes data obtained from the sensor system 110z. The image computing server 200 includes the front end server 230, a database 250 (to be also referred to as a DB hereinafter), a back end server 270, and a time server 290.

The time server 290 has a function of distributing a time and synchronization signal, and distributes a time and synchronization signal to the sensor systems 110a to 110z via the switching hub 180. Upon receiving the time and synchronization signal, the camera adapters 120a to 120z perform image frame synchronization by genlocking the cameras 112a to 112z based on the time and synchronization signal. That is, the time server 290 synchronizes the image capturing timings of the plurality of cameras 112. Since the image processing system 100 can generate a virtual viewpoint image based on the plurality of images captured at the same timing by adding information such as a time code to each captured image, lowering of the quality of the virtual viewpoint image caused by the shift of image capturing timings can be suppressed. Note that in this embodiment, the time server 290 manages the time synchronization of the plurality of cameras 112. However, the present invention is not limited to this, and the cameras 112 or camera adapters 120 may independently perform processing for the time synchronization.

After reconstructing a segmented transmission packet from images and sounds obtained from the sensor system 110z, and converting the data format, the front end server 230 writes the resultant data in the database 250 in accordance with a camera identifier, data type, and frame number.

The database 250 manages, in a state management table, the reception status of each frame or image data from each sensor system 110, which has been obtained from the sensor system 110z. For example, the reception statuses can be managed by setting, for each time and each camera, a flag to 0 if no image data has arrived and 1 if image data has arrived. More specifically, the reception statuses can be managed by setting, for every predetermined time (for example, every second), flags to 1 if all image data have arrived, and a flag to 1 or 0 for each time within the predetermined time and each camera if not all the image data have arrived.

The back end server 270 accepts a virtual viewpoint designation from the virtual camera operation UI 330, reads out corresponding image and sound data from the database 250 based on the accepted viewpoint, and performs rending processing, thereby generating a virtual viewpoint image. At this time, the database 250 provides data to the back end server 270 in accordance with the reception status in the state management table in response to a readout request from the back end server 270. The virtual viewpoint image having undergone the rendering processing is transmitted from the back end server 270 to the end user terminal 190. The user who operates the end user terminal 190 can browse the image and listen to the sound according to the viewpoint designation. That is, the back end server 270 generates a virtual viewpoint content based on the images (the plurality of viewpoint images) captured by the plurality of cameras 112 and viewpoint information. The virtual viewpoint content according to this embodiment is a content including a virtual viewpoint image as an image obtained when an object is captured from a virtual viewpoint. In other words, the virtual viewpoint image can be said to be an image representing a sight from a designated viewpoint. The virtual viewpoint may be designated by the user or may automatically be designated based on a result of image analysis or the like. The back end server 270 compression-codes the virtual viewpoint image by a standard technique represented by H.264 or HEVC and then transmits the virtual viewpoint image to the end user terminal 190 using the MPEG-DASH protocol.

As described above, the image processing system 100 includes three functional domains, that is, an image collection domain, a data storage domain, and an image generation domain. The image collection domain includes the sensor systems 110a to 110z. The data storage domain includes the database 250, the front end server 230, and the back end server 270. The image generation domain includes the virtual camera operation UI 330 and the end user terminal 190. Note that the arrangement is not limited to this. For example, the virtual camera operation UI 330 can also directly obtain images from the sensor systems 110a to 110z. In this embodiment, however, not the method of directly obtaining images from the sensor systems 110a to 110z but the method of arranging the data storage function midway is employed. More specifically, the front end server 230 converts image data and sound data generated by the sensor systems 110a to 110z and meta information of these data into a common schema and data type of the database 250.

The controller 300 includes a control station 310 and a virtual camera operation UI 330. The control station 310 performs management of operation states and parameter setting control for the respective blocks forming the image processing system 100 via networks 310a to 310d, 180a, 180b, and 170a to 170y.

The virtual camera operation UI 330 is configured to access the database 250 not directly but via the back end server 270. Common processing associated with image generation processing is performed by the back end server 270, and the difference portion of the application associated with the operation UI is performed by the virtual camera operation UI 330. Hence, when developing the virtual camera operation UI 330, the developer can concentrate on developing a UI operation device or functional requirements of a UI that operates a virtual viewpoint image to be generated. In addition, the back end server 270 can also add or delete common processing associated with image generation processing in accordance with a request of the virtual camera operation UI 330. This makes it possible to flexibly cope with a request of the virtual camera operation UI 330.

In the image processing system 100, the back end server 270 thus generates a virtual viewpoint image based on image data based on image capturing by the plurality of cameras 112 configured to capture an object from the plurality of directions. Note that the image processing system 100 according to this embodiment is not limited to the above-described physical arrangement and may have a logical arrangement.

Figure 2:
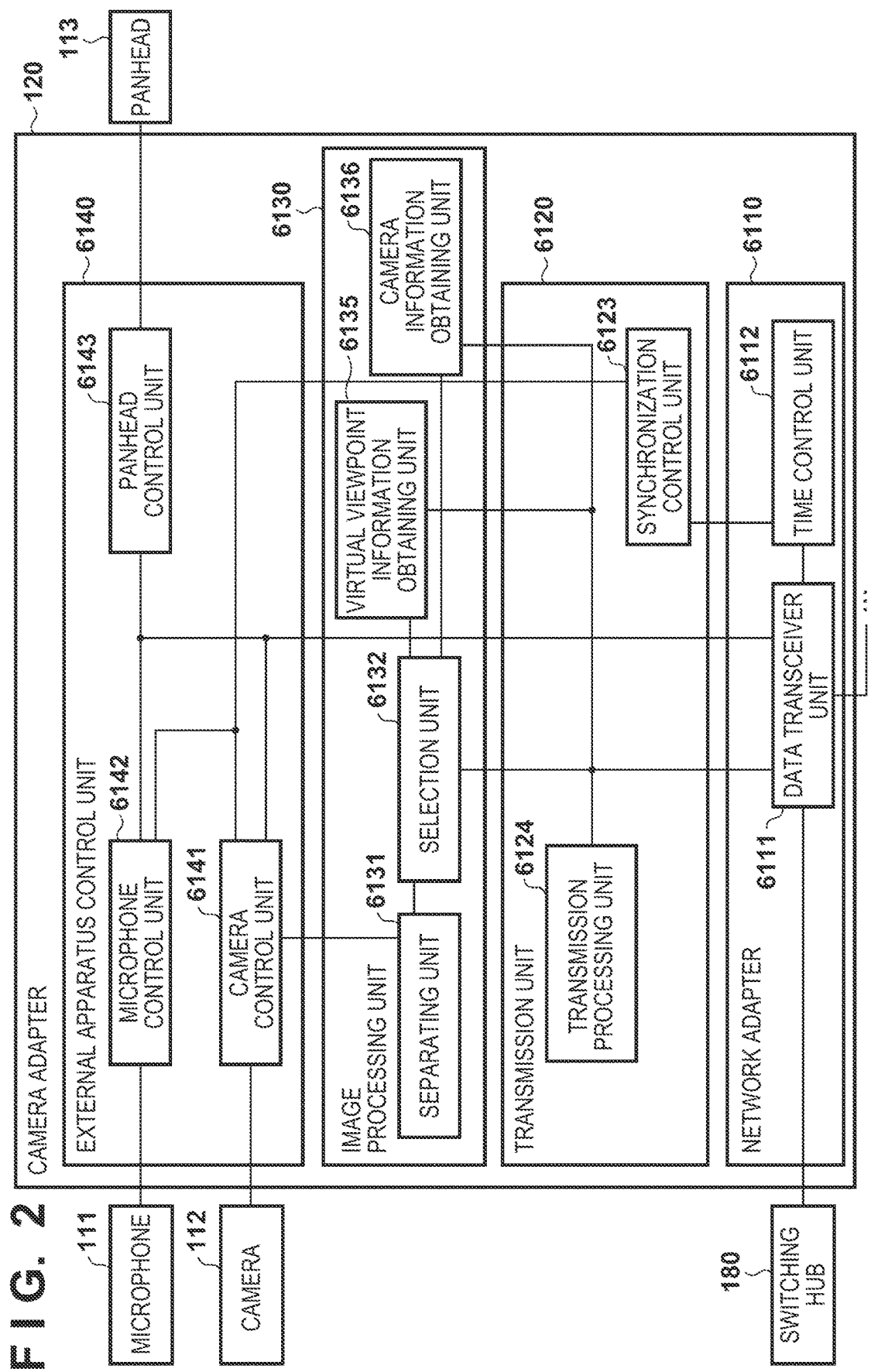
FIG. 2 is a block diagram for explaining an example of the functional arrangement of a camera adapter 120.

FIG. 2 is a block diagram for explaining the functional arrangement of the camera adapter 120.

The camera adapter 120 is an example of an information processing apparatus, and includes a network adapter 6110, a transmission unit 6120, an image processing unit 6130, and an external apparatus control unit 6140. The network adapter 6110 includes a data transceiver unit 6111 and a time control unit 6112.

The data transceiver unit 6111 executes data communication with another camera adapter 120, the front end server 230, the time server 290, and the control station 310 via the daisy chain 170, a network 291, and the network 310a. For example, the data transceiver unit 6111 outputs, to another camera adapter 120, a foreground image and a background image separated by the separating unit 6131 from an image captured by the camera 112. When each camera adapter 120 outputs a foreground image and a background image, the image processing system 100 generates a virtual viewpoint image using the foreground images and background images based on image capturing from a plurality of viewpoints. Note that there may be the camera adapter 120 that outputs the foreground image separated from the captured image but outputs no background image. The foreground image and the background image may be separated in the image computing server 200 (to be described later).

The time control unit 6112 complies with, for example, IEEE1588 Ordinary Clock, and has a function of saving the time stamp of the data transmitted/received to/from the time server 290. The time control unit 6112 performs time synchronization with the time server 290. Note that the present invention is not limited to IEEE1588, and time synchronization with the time server 290 may be implemented by the EtherAVB standard or a proprietary protocol. In this embodiment, a NIC (Network Interface Card) is used as the network adapter 6110. However, the present invention is not limited to the NIC, and another similar interface may be used. Furthermore, IEEE1588 is updated as the standard specification like IEEE1588-2002 and IEEE1588-2008, and the latter is also called PTPv2 (Precision Time Protocol Version 2).

The transmission unit 6120 has a function of controlling transmission of data to the switching hub 180 or the like via the network adapter 6110, and is formed from the following functional units.

A synchronization control unit 6123 complies with IEEE1588 PTP (Precision Time Protocol), and has a function of performing processing associated with time synchronization with the time server 290. Note that the present invention is not limited to PTP, and time synchronization may be performed using another similar protocol.

A transmission processing unit 6124 has a function of creating a message for transmitting image data or sound data to another camera adapter 120 or the front end server 230 via the data transceiver unit 6111. The message includes the image data or sound data and meta information of the data. The meta information according to this embodiment includes a time code or sequence number obtained when capturing an image or sampling a sound, a data type, and an identifier indicating the individual of the camera 112 or the microphone 111. The transmission processing unit 6124 receives a message from another camera adapter 120 via the data transceiver unit 6111. In accordance with the data type included in the message, data information fragmented in a packet size defined by a transmission protocol is restored to the image data or sound data.

The image processing unit 6130 has a function of obtaining image data captured by the camera 112 and performing processing to be described next for the obtained data under the control of a camera control unit 6141, and is formed from the following functional units.

A separating unit 6131 obtains image data captured by the camera 112. That is, the separating unit 6131 functions as an image obtaining unit that obtains a captured image. Then, the separating unit 6131 performs processing of separating the captured image into a foreground image and a background image. The separating unit 6131 of each of the plurality of camera adapters 120 extracts a predetermined region from an image captured by a corresponding one of the plurality of cameras 112. The predetermined region is, for example, a foreground image obtained as a result of object detection from the captured image. With this extraction processing, the separating unit 6131 separates the captured image into the foreground image and a background image as the remaining portion.

Note that the object is, for example, a person. However, the object may be a specific person (a player, a coach, and/or a referee) or an object such as a ball with a predetermined image pattern. A moving body may be detected as the object. When a foreground image including an important object such as a person and a background image that does not include such an object are separated and processed, the quality of the image of a portion corresponding to the object in a virtual viewpoint image generated by the image processing system 100 can be improved. In addition, when the separation of the foreground image and the background image is performed by each of the plurality of camera adapters 120, the load in the image processing system 100 including the plurality of cameras 112 can be distributed. Note that the extracted predetermined region is not limited to the foreground image, and may be, for example, the background image. In this embodiment, the camera adapter 120 performs the separation of the foreground image and the background image. The present invention, however, is not limited to this, and another device such as the front end server 230 in the system may separate the captured image obtained by each camera into the foreground image and the background image.

Based on pieces of information obtained by a virtual viewpoint information obtaining unit 6135 and a camera information obtaining unit 6136, a selecting unit 6132 selects data whose information amount is to be reduced out of the data of the foreground image and background image separated by the separating unit 6131. The selecting unit 6132 reduces the information amount of the selected data, and transmits the data to the data transceiver unit 6111. That is, the selecting unit 6132 functions as a reduction unit and a transmission unit. Note that details of the processing of the selecting unit 6132 will be described later.

The camera information obtaining unit 6136 obtains, from the control station 310 via the networks 310a, 180a, and 180b, the switching hub 180, and the daisy chains 170a to 170y, information (to be referred to as camera position information or camera viewpoint information hereinafter) about at least one of the position and orientation of the camera 112 measured in advance. The camera position information (camera viewpoint information) includes, for example, information indicating the position of the camera, and information indicating the orientation of the optical axis of the camera and the posture of the camera. That is, the camera information obtaining unit 6136 functions as the first obtaining unit that obtains information about at least one of the position and orientation of the image capturing apparatus. Note that the camera adapter 120 may obtain the camera position information in advance, record it in a recording unit installed in the camera adapter, and then read out and obtain it when using it.

The virtual viewpoint information obtaining unit 6135 obtains, via the networks 310a, 180a, and 180b, the switching hub 180, and the daisy chains 170a to 170y, information (to be referred to as virtual viewpoint position information or virtual viewpoint information hereinafter) about at least one of the position and orientation of the virtual viewpoint designated by the user with the controller 300. The virtual viewpoint position information (virtual viewpoint information) includes, for example, the position of the virtual viewpoint, the orientation of the optical axis of the virtual viewpoint, and a focal length. That is, the virtual viewpoint information obtaining unit 6135 functions as the second obtaining unit that obtains information about at least one of the position and orientation of the virtual viewpoint.

The external apparatus control unit 6140 is formed from the camera control unit 6141, a microphone control unit 6142, and a panhead control unit 6143.

The camera control unit 6141 has a function of performing connection to the camera 112 to, for example, control the camera 112, obtain a captured image, provide a synchronization signal, and perform time setting. The control of the camera 112 includes, for example, setting of and referring to image capturing parameters (such as the setting of the number of pixels, a color depth, a frame rate, and white balance). The control also includes obtaining of the state (during image capturing, during a stop, during synchronization, an error, or the like) of the camera 112, the start and stop of image capturing, and focus adjustment. The synchronization signal is provided when the synchronization control unit 6123 provides an image capturing timing (control clock) to the camera 112 using the time synchronized with the time server 290. Time setting is performed when the synchronization control unit 6123 provides the time synchronized with the time server 290 using, for example, a time code complying with SMPTE12M. This adds the provided time code to the image data received from the camera 112. Note that the format of the time code is not limited to SMPTE12M, and another format may be adopted. The camera control unit 6141 may add a time code to the image data received from the camera 112 without providing the time code to the camera 112.

The microphone control unit 6142 has a function of performing connection to the microphone 111 to, for example, control the microphone 111, start and stop sound collection, and obtain collected sound data.

The panhead control unit 6143 has a function of performing connection to the panhead 113 to control the panhead 113. The control of the panhead 113 includes, for example, pan/tilt control and obtaining of a state.

Figure 3:
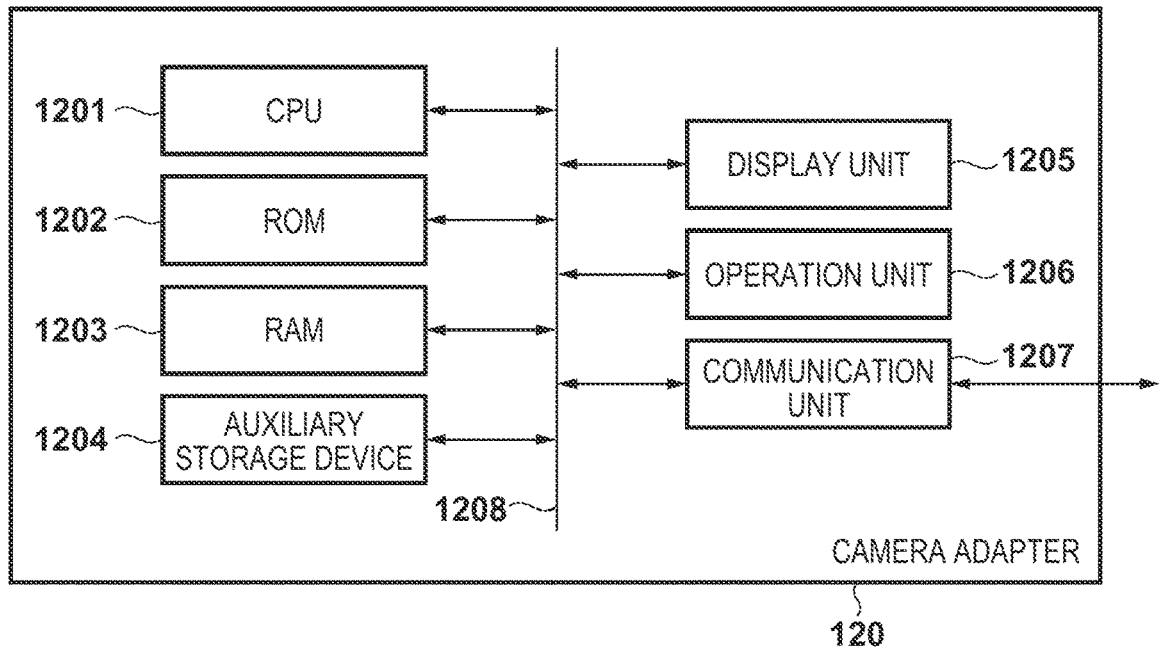
FIG. 3 is a block diagram showing an example of the hardware arrangement of the camera adapter 120.

FIG. 3 is a block diagram showing the hardware arrangement of the camera adapter 120.

The camera adapter 120 includes a CPU 1201, a ROM 1202, a RAM 1203, an auxiliary storage device 1204, a display unit 1205, an operation unit 1206, a communication unit 1207, and a bus 1208.

The CPU 1201 controls the overall camera adapter 120 using computer programs and data stored in the ROM 1202 and the RAM 1203. The ROM 1202 stores programs and parameters that do not require change. The RAM 1203 temporarily stores programs and data supplied from the auxiliary storage device 1204, and data and the like supplied externally via the communication unit 1207. The auxiliary storage device 1204 is formed from, for example, a hard disk drive and stores content data such as still images and moving images.

The display unit 1205 is formed from, for example, a liquid crystal display and displays, for example, a GUI (Graphical User Interface) for operating the camera adapter 120 by the user. The operation unit 1206 is formed from, for example, a keyboard and a mouse, receives an operation by the user, and inputs various instructions to the CPU 1201. The communication unit 1207 communicates with external devices such as the camera 112 and the front end server 230. The bus 1208 connects the respective units of the camera adapter 120 and transmits information.

Note that devices such as the front end server 230, the database 250, the back end server 270, the control station 310, the virtual camera operation UI 330, and the end user terminal 190 can also be included in the hardware arrangement in FIG. 3. The functions of the above-described devices may be implemented by software processing using the CPU or the like.

In this embodiment, the foreground image and the background image are transmitted among the plurality of camera adapters 120 connected by daisy chains and input to the front end server 230. Since the foreground image includes an object important more than in the background image, the foreground image is transmitted at high image quality and/or high frame rate. Therefore, if the foreground region in the captured image is excessively large, the data amount of the foreground image to be transmitted is enormous.

Figure 4:
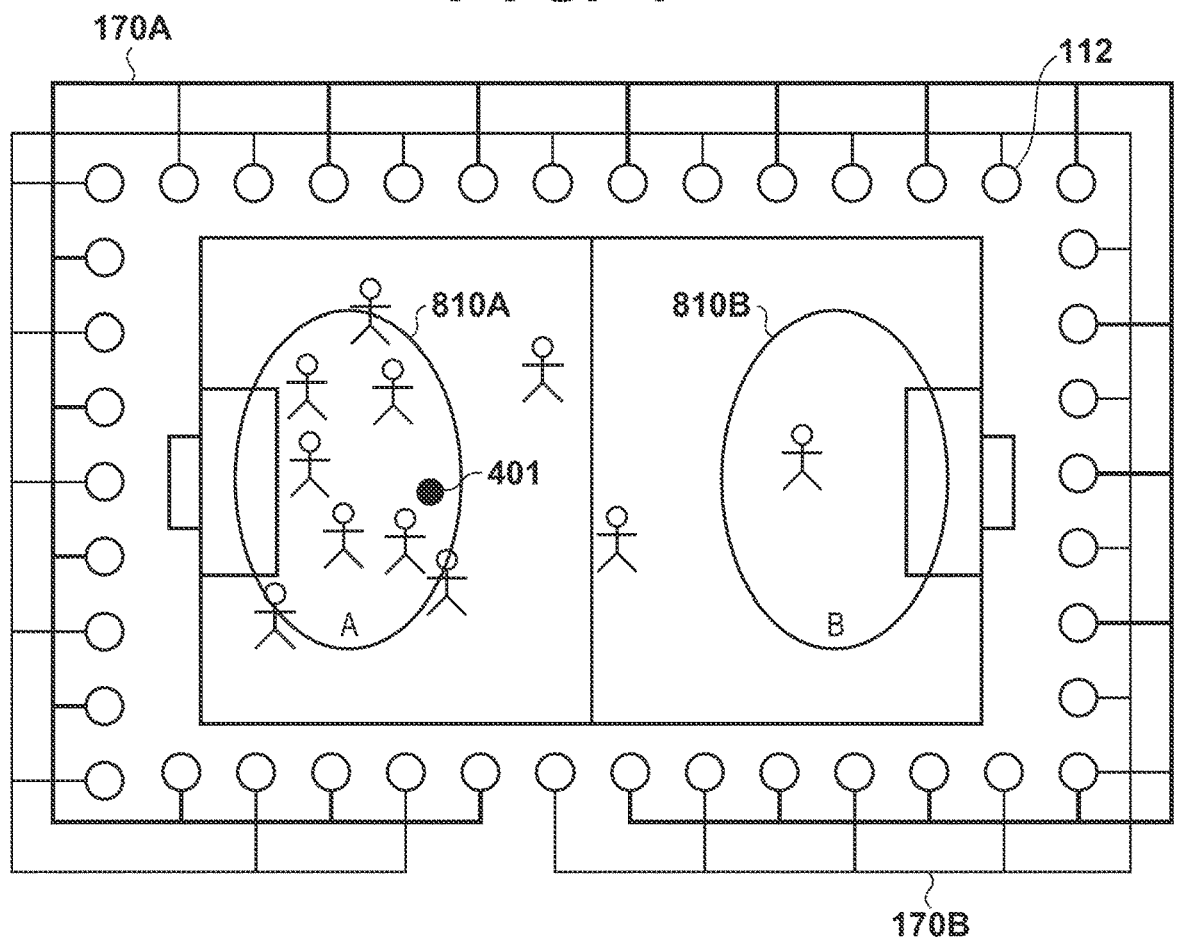
FIG. 4 is a view showing an example of a soccer stadium according to the first embodiment.

An example in which the image processing system 100 according to this embodiment is installed in a soccer stadium will be described with reference to FIG. 4. FIG. 4 is a view showing an example of the soccer stadium according to this embodiment. Referring to FIG. 4, the daisy chains 170 connected to the plurality of cameras 112 are divided into two systems 170A and 170B. The cameras 112 connected to the networks are placed to capture regions (regions 810A and 810B of interest) in front of different goals for the respective networks. In this embodiment, two image processing systems 100 (not shown) are installed for the regions 810A and 810B of interest, respectively. As a feature of a team sport such as a soccer, the number of players is large in a region where there is a ball. For example, in the example of FIG. 4, in the region 810A of interest including a ball 401, there are players more than in the region 810B of interest. Therefore, an image captured by the sensor system 110 that captures the region 810A of interest on the side on which there is the ball 401 includes many objects as the foreground image, and has an increased image data amount to be transmitted. On the other hand, the number of players who are located on the side on which there is no ball is small. Therefore, in the sensor system 110 that captures the region 810B of interest on the side on which there is no ball, the number of objects as the foreground image decreases, and the image data amount to be transmitted decreases. If the number of players in the region of interest increases, the output data amount of the sensor system 110 that covers the region of interest increases. Thus, if the sensor system 110 transmits the data intact, in the sensor system 110 connected to the downstream side of the network of the daisy chains, the communication band is saturated with the data transmitted from the upstream side, thereby entering a state in which it is impossible to transmit data.

To solve this problem, control is performed not to exceed a transmission band, for which a data amount transmitted by the daisy chains is preset, when players gather in the region of interest and the output data amount increases. In this embodiment, the information amount of a captured image with low contribution to generation of a virtual viewpoint image is reduced based on the positional relationship between the virtual viewpoint and the camera. This prevents the transmission band for which the data amount is preset from being exceeded, thereby preventing the communication band from being saturated. The processing according to this embodiment will be described below with reference to FIGS. 5 and 6.

Figure 5:
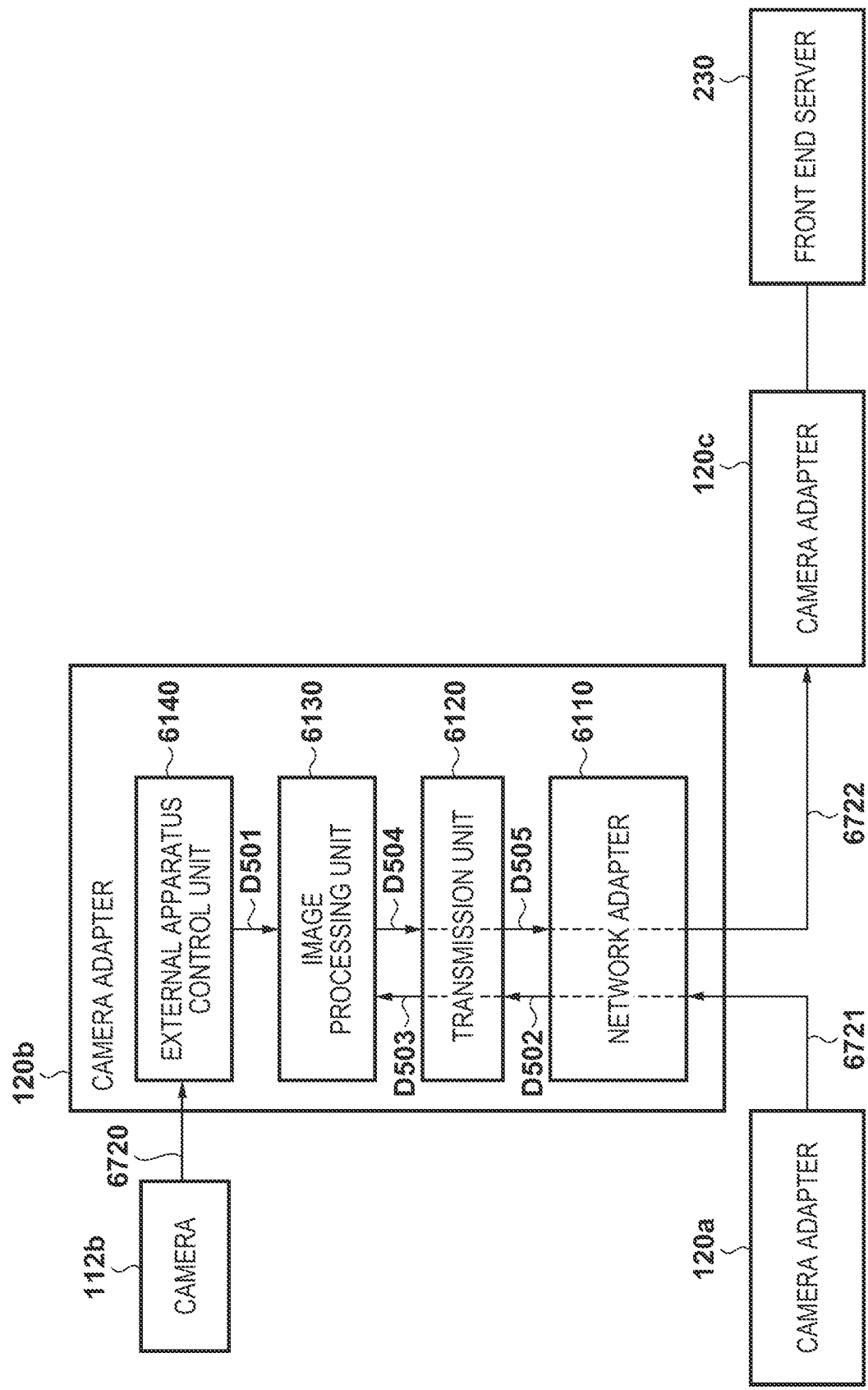
FIG. 5 is a view showing the flow of data among camera adapters.

FIG. 5 is a view showing the flow of data among the camera adapters 120a, 120b, and 120c. The camera adapters 120a and 120b are connected to each other, and the camera adapters 120b and 120c are connected to each other. The camera 112b is connected to the camera adapter 120b, and the camera adapter 120c is connected to the front end server 230. The procedure of data output of the image processing unit 6130 of the camera adapter 120b will now be described.

The image processing unit 6130 of the camera adapter 120b receives (D501) a captured image 6720 sent from the camera 112b via the external apparatus control unit 6140.

The image processing unit 6130 receives (D503), from the transmission unit 6120, data 6721 transmitted (D502) from the camera adapter 120a via the network adapter 6110. The data 6721 transmitted from the camera adapter 120a includes virtual viewpoint position information including the position, orientation, and focal length of a virtual viewpoint, and camera position information including the positions and orientations of the cameras 112b to 112z.

The image processing unit 6130 performs image processing and data amount adjustment (to be described in detail with reference to FIG. 6) for the captured image 6720, and sends (D504) the resultant image to the transmission unit 6120. At this time, meta information including a time code for the captured image 6720 is also transmitted.

The data transmitted by the image processing unit 6130 includes the data 6721 obtained by excluding the camera position data of the camera 112b. The transmission unit 6120 performs processing such as packetization for the input data, and sends (D505) the resultant data to the network adapter 6110.

The camera adapter 120c receives data 6722 from the network adapter 6110.

Figure 6:
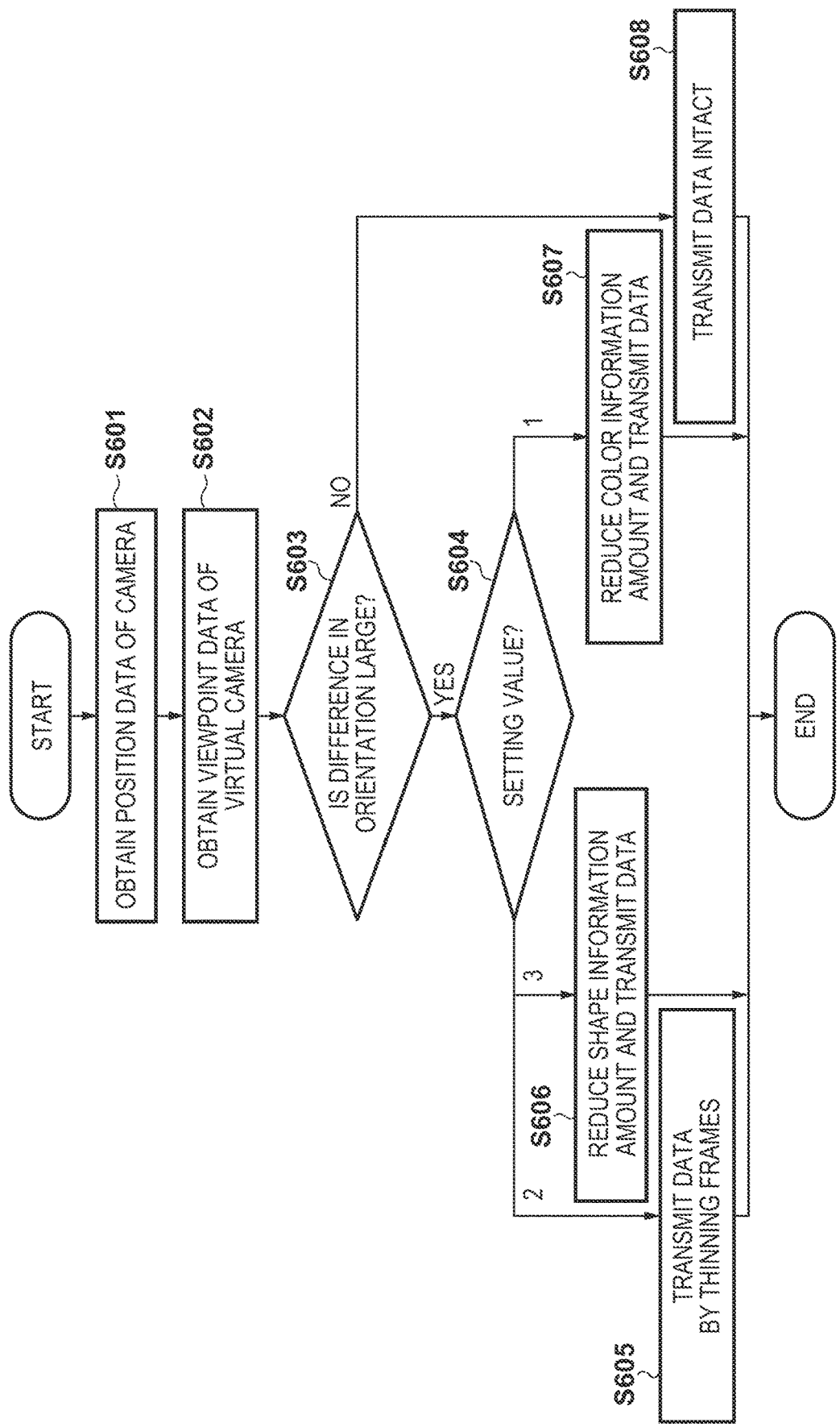
FIG. 6 is a flowchart illustrating data amount reduction processing performed for each frame in an image processing unit 6130 according to the first embodiment.

FIG. 6 is a flowchart illustrating data amount reduction processing performed for each frame in the image processing unit 6130. The processing shown in FIG. 6 is implemented when the CPU 1201 of the camera adapter 120b causes the module of the camera adapter 120 to function by loading a program stored in the ROM 1202 into the RAM 1203 and executing it. Note that at least part of the processing shown in FIG. 6 may be implemented by dedicated hardware different from the CPU 1201.

In step S601, the camera information obtaining unit 6136 obtains the camera position information (the position data of the camera) of the camera 112b. In the example of FIG. 5, camera position information of the camera 112b is obtained from the data sent from the camera adapter 120a.

In step S602, the virtual viewpoint information obtaining unit 6135 obtains virtual viewpoint position information (the viewpoint data of a virtual camera). In the example of FIG. 5, the virtual viewpoint position information is obtained from the data sent by the camera adapter 120a.

In step S603, the selecting unit 6132 calculates the difference between the orientation of the optical axis of the virtual viewpoint and that of the optical axis of the camera 112b, and determines whether the difference is larger than a predetermined value Th_ang. The processing in step S603 will be described in more detail with reference to FIG. 7.

Figure 7:
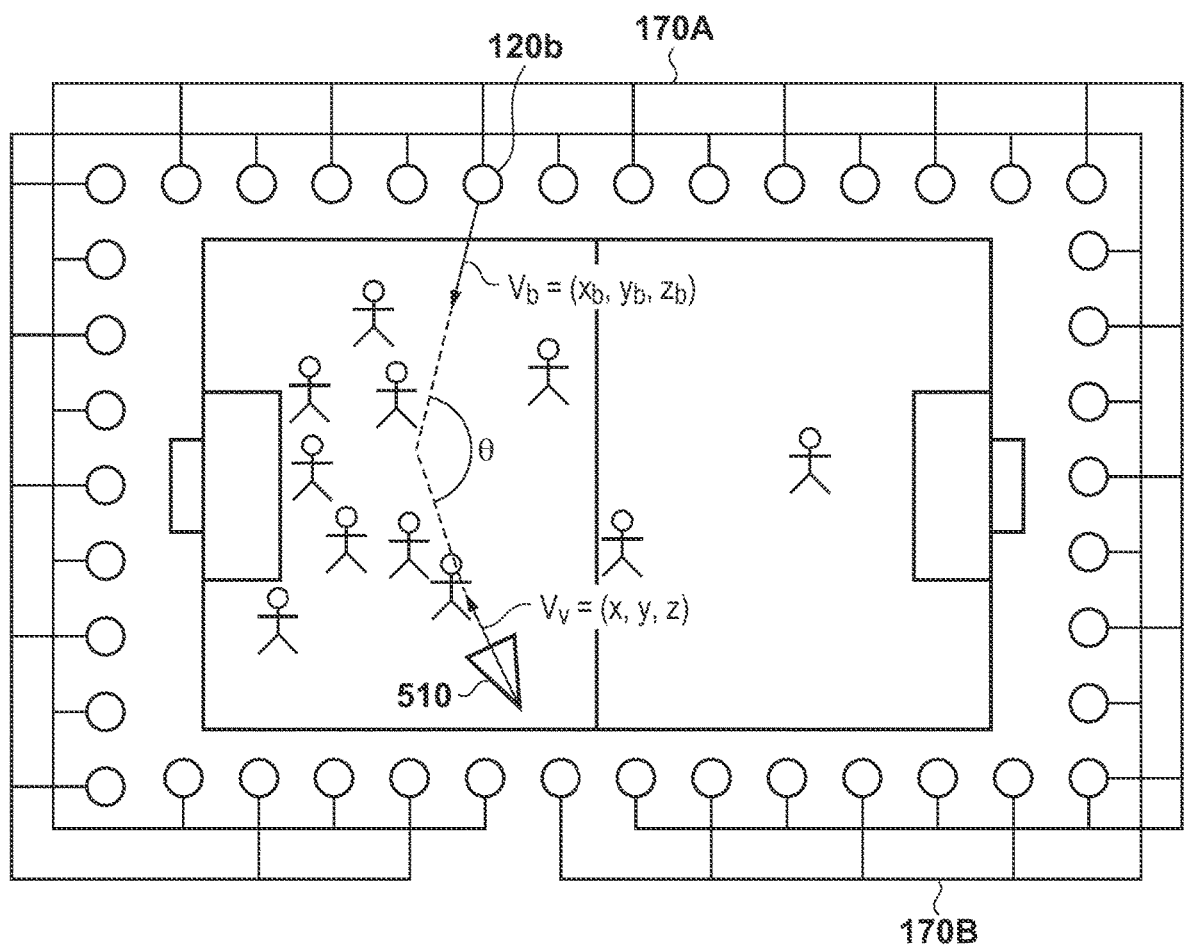
FIG. 7 is a view showing the orientation of the optical axis of a virtual viewpoint and that of the optical axis of a camera 112b.

FIG. 7 is a view showing the orientation of the optical axis of the virtual viewpoint and that of the optical axis of the camera 112b. As shown in FIG. 7, the orientation of the optical axis of a virtual viewpoint 510 is expressed by a three-dimensional unit vector Vv=(x, y, z), and the orientation of the optical axis of the camera 112b is expressed by a three-dimensional unit vector Vb=(xb, yb, zb). In this case, the difference between the orientations, that is, an angle θ formed by Vv and Vb can be obtained by:

$$\theta = \arccos(Vv \cdot Vb) \cdot 180/\pi = \arccos(x \cdot xb + y \cdot yb + z \cdot zb) \cdot 180/\pi \quad (°) \qquad (1)$$

In this embodiment, it is determined for the camera 112b whether θ is larger than Th_ang=90°. The predetermined value Th_ang may be designated by the user, or may be automatically determined, based on the designated virtual viewpoint, as a value corresponding to an image capturing range important for generation of a virtual viewpoint image. Alternatively, another method may be used to determine Th_ang. As for a captured image of a camera having θ of a large value, that is, a captured image with low contribution to generation of a virtual viewpoint image, the transmission load can be decreased by reducing the information amount. Note that the captured image with low contribution to generation of a virtual viewpoint image is not limited to an image determined based on the relationship between the orientation of the virtual viewpoint and that of the camera 112. For example, such captured image may be determined based on whether the distance between the position of the virtual viewpoint and that of the camera 112 falls within a predetermined range or based on both the positional relationship and orientation relationship between the virtual viewpoint and the camera 112.

Referring back to FIG. 6, if it is determined that the value obtained by equation (1) is equal to or smaller than the predetermined value (NO in step S603), the selecting unit 6132 sends, in step S608, the data to the transmission unit 6120 without reducing the data amount.

If it is determined that the value obtained by equation (1) is larger than the predetermined value (YES in step S603), the selecting unit 6132 obtains, in step S604, a setting value indicating the contents of processing of reducing the data amount. The setting value may be determined based on, for example, the magnitude of the difference θ, the camera position, the positional relationship between the camera and the object to be captured, or the like, or may be determined in advance in accordance with designation by the user.

In step S607 (setting value=1), the selecting unit 6132 reduces color information of the foreground image, and transmits the image. This processing can reduce information with low contribution to generation of a virtual viewpoint image, for example, color information corresponding to a region on the rear side of the object when viewed from the virtual viewpoint. An information reduction target is not limited to the foreground image. For example, color information may be reduced from part or all of the background image corresponding to a region outside the angle of view when viewed from the virtual viewpoint. Color information may be reduced from the captured image before the separation of the foreground image and the background image. Instead of reducing the color information, the data amount may be reduced by image compression or sampling (reduction).

As another process, in step S605 (setting value=2), the selecting unit 6132 transmits frames by thinning frames so that there are the time at which the frames of the foreground image and background image are transmitted and the time at which no frames are transmitted. At this time, the thinned frames may be recorded in a recording unit (not shown).

As another process, in step S606 (setting value=3), the selecting unit 6132 reduces a binary image representing the silhouette shape of the foreground region, and transmits it. This processing can reduce shape information with low contribution to generation of a virtual viewpoint image, for example, information for obtaining the shape of an object shielded by an object on the near side when viewed from the virtual viewpoint.

Note that the processing selected in step S604 is not limited to the above ones, and any processing capable of reducing information with low contribution to generation of a virtual viewpoint image is selected. For example, processing of degrading the quality of an image with low contribution to generation of a virtual viewpoint image or processing in which information with low contribution to or unused for generation of a virtual viewpoint image is not transmitted may be selected. Some of the above-described processes may be combined.

As described above, the image processing system according to this embodiment reduces information with low contribution to generation of a virtual viewpoint image based on a virtual viewpoint and position information of a camera. This can lighten the transmission load of the network, and suppresses degradation in quality of a content.

Second Embodiment

The first embodiment assumes that the number of virtual viewpoints is one. However, there may be a case in which a plurality of users browse a content, and designate a plurality of virtual viewpoints. This example will be described as the second embodiment.

Figure 8:
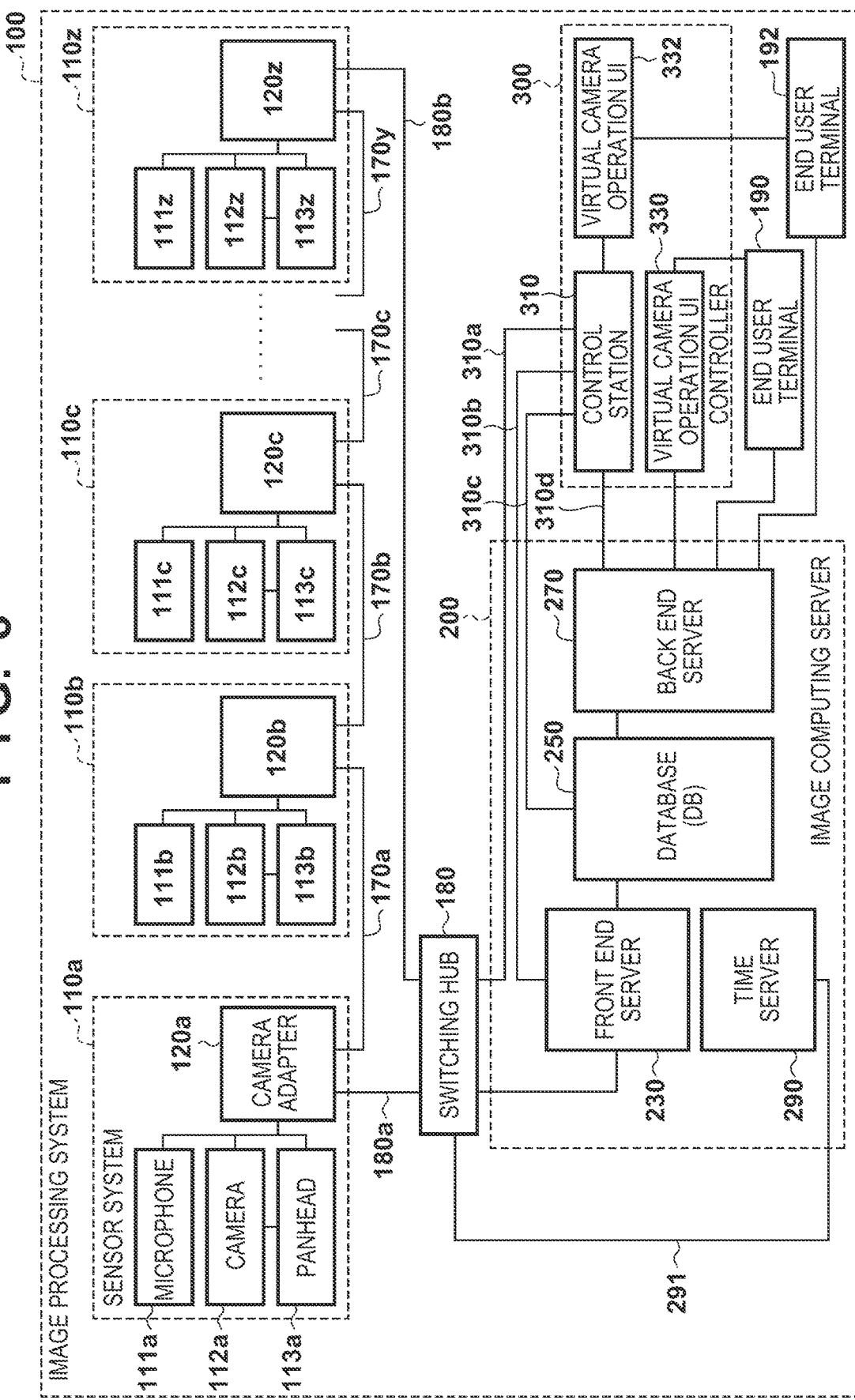
FIG. 8 is a block diagram showing an example of the arrangement of an image processing system 100 according to the second embodiment.

FIG. 8 is a block diagram showing an example of the arrangement of an image processing system 100 according to the second embodiment. A plurality of end user terminals 190 and 192 are connected to virtual camera operation UIs 330 and 332 via a wireless or wired network. Then, a virtual viewpoint position information is transmitted to an image processing unit 6130 in a camera adapter via a control station 310, networks 310a, 180a, and 180b, a switching hub 180, and daisy chains 170a to 170y. The remaining system components are the same as in the first embodiment, and a description thereof will be omitted.

Figure 9:
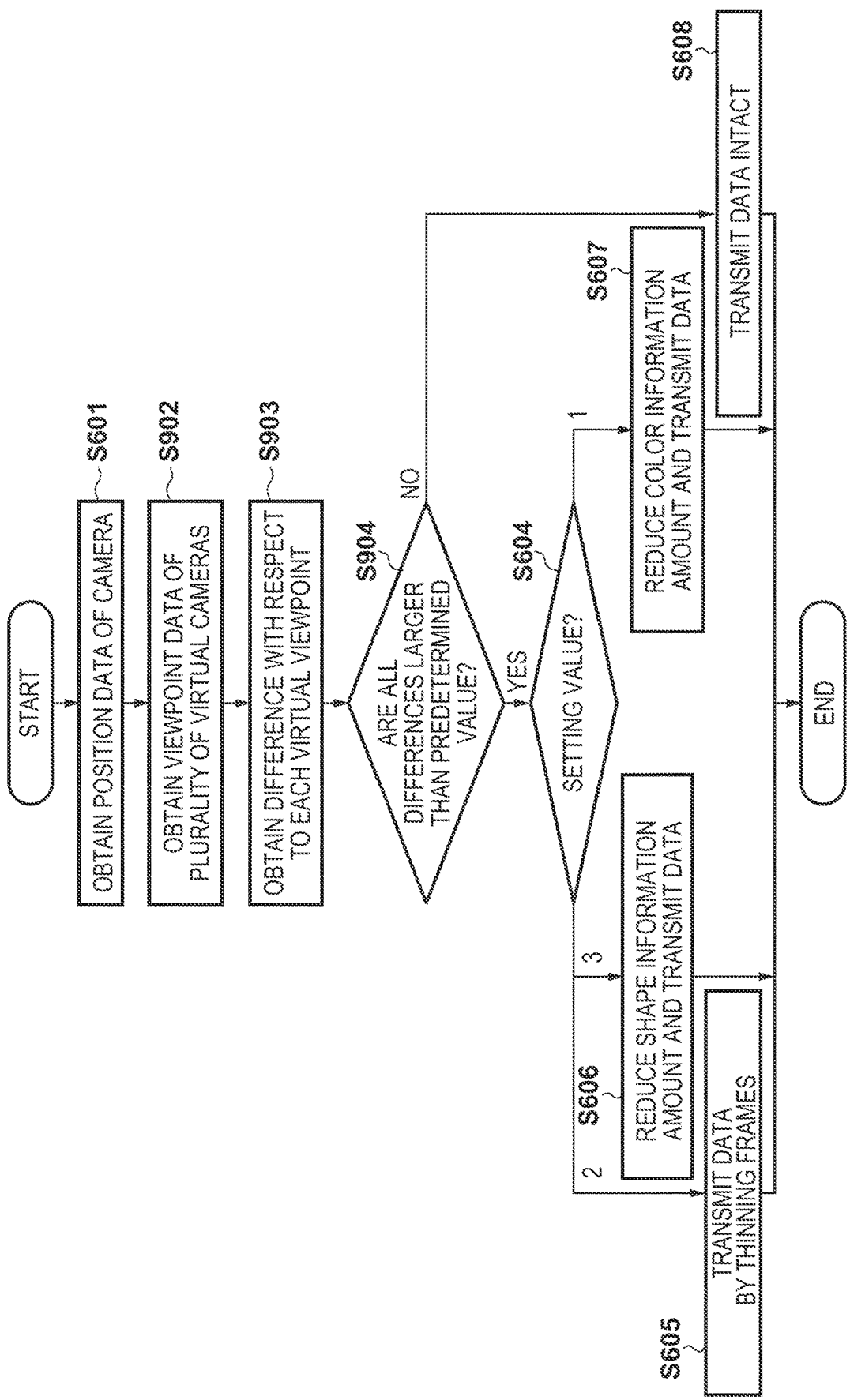
FIG. 9 is a flowchart illustrating data amount reduction processing performed for each frame in an image processing unit 6130 according to the second embodiment.

FIG. 9 is a flowchart illustrating the procedure of data amount reduction processing performed for each frame in the image processing unit 6130 according to the second embodiment. A description of the same processing steps as in the first embodiment will be omitted below.

In step S902, a virtual viewpoint information obtaining unit 6135 obtains pieces of virtual viewpoint position information of a plurality of virtual viewpoints designated by the end user terminals 190 and 192. In step S903, a selecting unit 6132 calculates a difference in orientation of an optical axis with respect to each virtual viewpoint.

In step S904, the selecting unit 6132 determines whether all the calculated differences are larger than a predetermined value. If it is determined that one or more differences are equal to or smaller than the predetermined value (NO in step S904), the data is transmitted intact in step S608 without reducing the data amount. Note that a determination method is not limited to this. For example, the number of virtual viewpoints with small differences is equal to or larger than a predetermined number, the data may be transmitted intact.

On the other hand, if it is determined that all the differences are larger than the predetermined value (YES in step S904), the selecting unit 6132 obtains a setting value in step S604. In steps S605 to S607, the selecting unit 6132 reduces the data amount, and transmits the data.

As described above, if there are a plurality of virtual viewpoints, for example, it is possible to reduce the information amount of a captured image of a region that cannot be seen from all the virtual viewpoints.

Third Embodiment

The second embodiment has explained the method of lightening the load of data transmission between networks by reducing the data amount in the camera adapter 120 when a plurality of virtual viewpoints are designated. The third embodiment will describe data amount reduction when transmitting data from a front end server 230 to a database 250. Note that a system arrangement according to the third embodiment is the same as in the second embodiment and a description thereof will be omitted.

Figure 10:
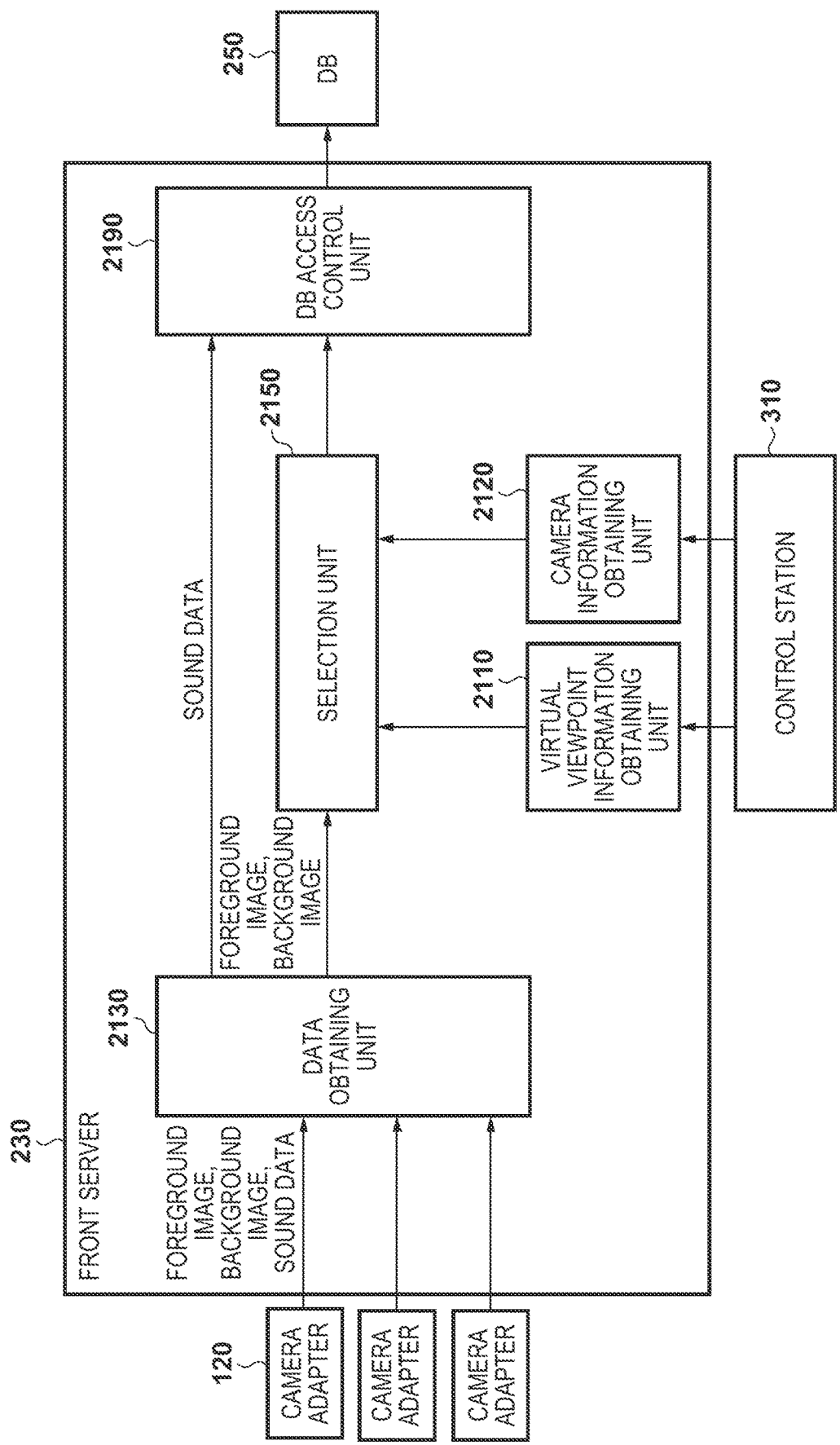
FIG. 10 is a block diagram showing an example of the arrangement of a front end server 230 according to the third embodiment.

FIG. 10 is a block diagram showing the arrangement of a front end server 230 according to the third embodiment.

A virtual viewpoint information obtaining unit 2110 obtains virtual viewpoint position information from a control station 310. A camera information obtaining unit 2120 obtains camera position information of each camera 112 from the control station 310.

A data obtaining unit 2130 obtains a foreground image, a background image, sound data, and parameters of these data from each camera adapter 120. A selecting unit 2150 selects the camera for which the data amount of the obtained data is to be reduced, and performs data amount reduction processing for the data of the selected camera. A DB access control unit 2190 functions as a write unit that writes the data with the reduced data amount in the DB 250.

Figure 11:
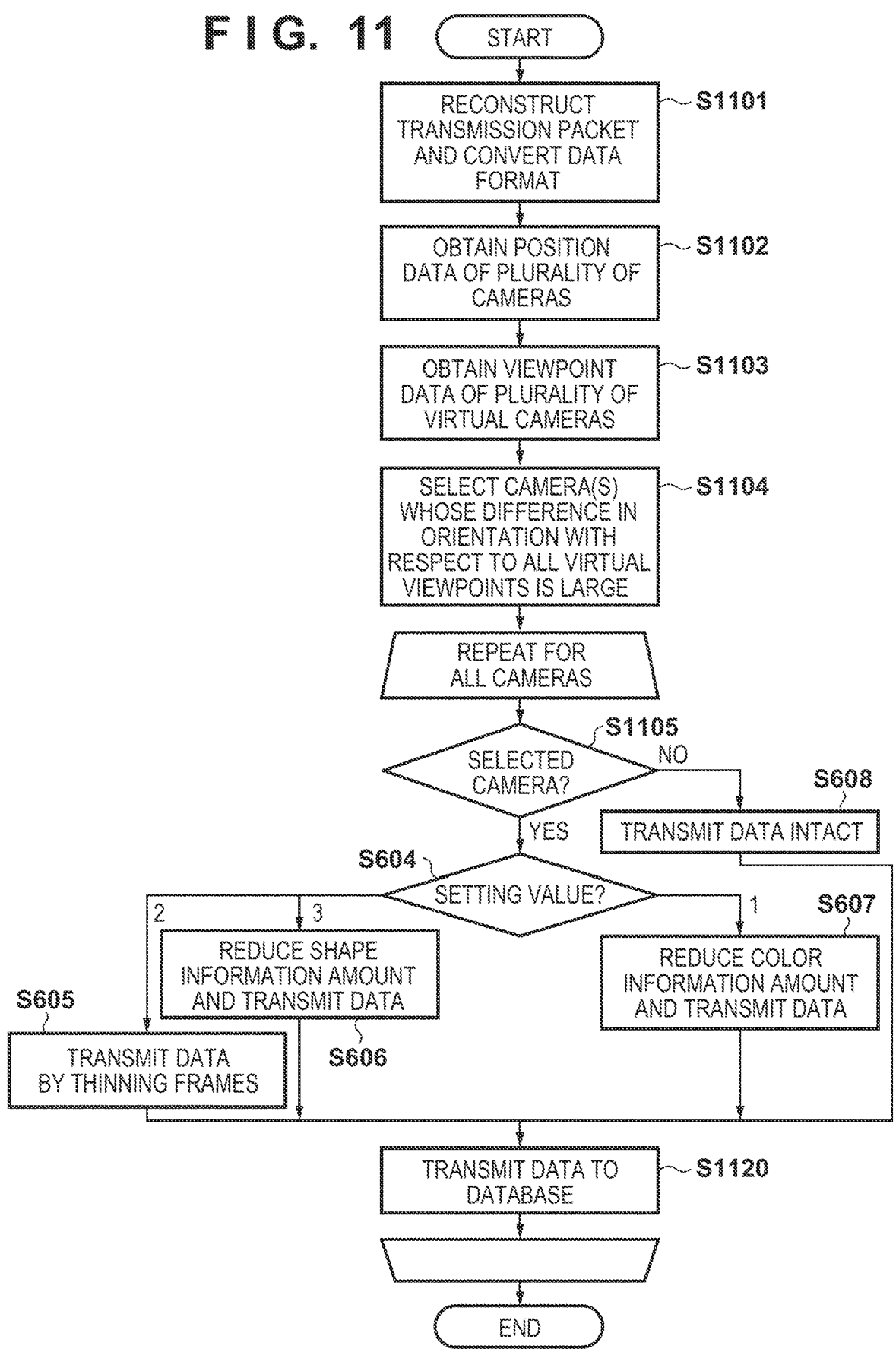
FIG. 11 is a flowchart illustrating data amount reduction processing according to the third embodiment.

FIG. 11 shows the procedure of the data amount reduction processing according to the third embodiment. A description of the same processing steps as in the first embodiment will be omitted below.

In step S1101, the data obtaining unit 2130 of the front end server 230 reconstructs a transmission packet for each frame, and converts the data format.

In step S1102, the camera information obtaining unit 2120 obtains pieces of camera position information of the plurality of cameras 112 from the control station 310 via a network 310b.

In step S1103, the virtual viewpoint information obtaining unit 2110 obtains pieces of virtual viewpoint position information of a plurality of virtual viewpoints from the control station 310 via the network 310b.

In step S1104, the selecting unit 2150 calculates a difference between the orientation of the optical axis of each virtual viewpoint and that of the optical axis of each camera, similarly to the first embodiment, based on the pieces of information obtained by the camera information obtaining unit 2120 and the virtual viewpoint information obtaining unit 2110. The selecting unit selects one or a plurality of camera(s) having the difference larger than a predetermined value is selected. Note that a selection method will be described in detail with reference to FIG. 12.

Processes in steps S1105 to S1120 are executed for all the cameras. In step S1105, the selecting unit 2150 performs the processes in steps S604 to S607 for the camera selected in step S1104 to reduce the data amount and transmit the data to the DB access control unit 2190. For each of the cameras unselected in step S1104, the data is transmitted intact to the DB access control unit 2190 (step S608). In step S1120, the DB access control unit 2190 converts the data into a common schema and data type of the database 250, and transmits it to the database 250.

Figure 12:
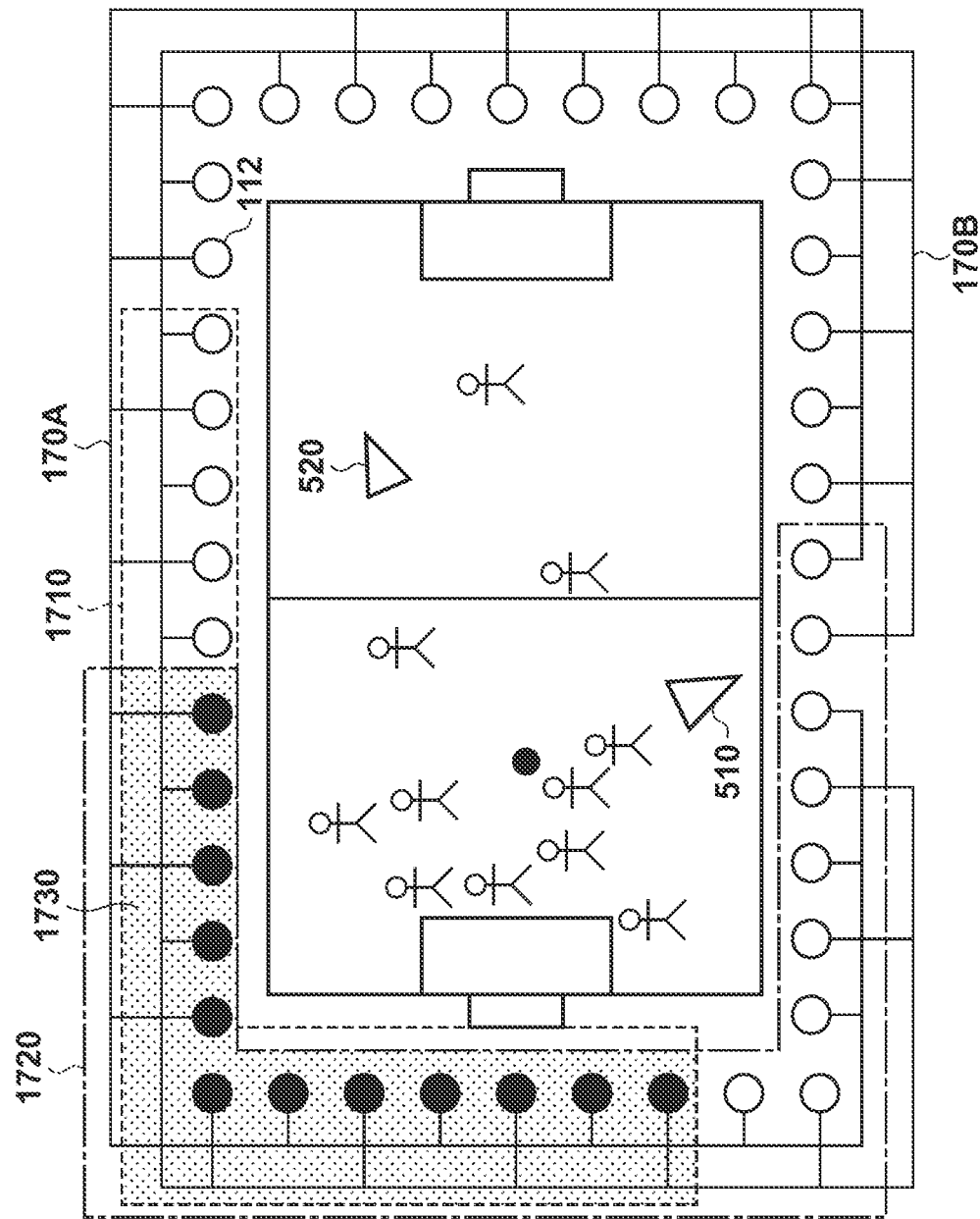
FIG. 12 is a view for explaining a camera selection method.

FIG. 12 is a view for explaining the camera selection method. FIG. 12 shows the plurality of cameras 112 and virtual viewpoints 510 and 520 designated by end user terminals 190 and 192. The selecting unit 2150 obtains a difference between the orientation of the optical axis of each camera and that of the optical axis of each of the virtual viewpoints 510 and 520. Referring to FIG. 12, a camera group 1710 includes the cameras for which it is determined that the difference from the orientation of the optical axis of the virtual viewpoint 510 is larger than the predetermined value. A camera group 1720 includes the cameras for which it is determined that the difference from the orientation of the optical axis of the virtual viewpoint 520 is larger than the predetermined value. The selecting unit 2150 selects, as cameras for which it is determined that the differences with respect to the virtual viewpoints 510 and 520 are larger than the predetermined value, a camera group 1730 that is a product set of the camera groups 1710 and 1720. The example in which the number of virtual viewpoints is two has been explained. However, the same processing can be performed when the number of virtual viewpoints is one. That is, the processing is performed, in which the front end server 230 selects the camera for which it is determined that the difference from the orientation of the optical axis of each virtual viewpoint is larger than the predetermined value, and reduces the data amount of an image captured by the camera. Even if the number of virtual viewpoints is larger than two, a difference in orientation of the optical axis between each camera and each virtual viewpoint may be obtained, and a product set of camera groups may be obtained, as described above. Another method capable of specifying a camera that captures an image with low contribution to generation of a virtual viewpoint image may be used to select a camera.

As described above, it is possible to lighten the data transmission load when transmitting data from the front end server 230 to the database 250.

Fourth Embodiment

The third embodiment has explained the method of reducing the data amount in the front end server 230. The fourth embodiment will describe data amount reduction when a database 250 writes data. A system arrangement is the same as in the first embodiment and a description thereof will be omitted.

Figure 13:
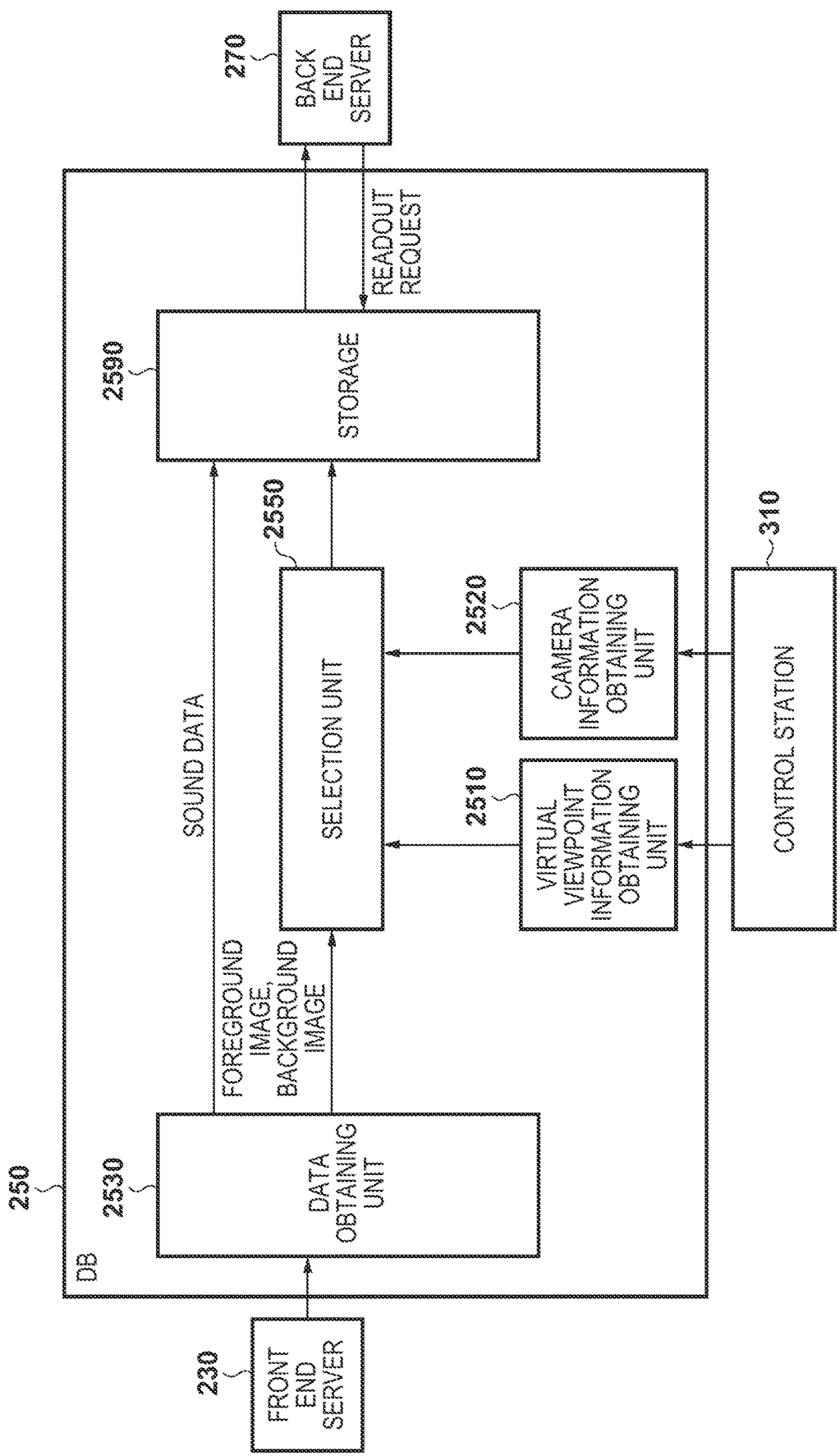
FIG. 13 is a block diagram showing an example of the arrangement of a database 250 according to the fourth embodiment.

FIG. 13 is a block diagram showing the arrangement of the database 250 according to the fourth embodiment.

A virtual viewpoint information obtaining unit 2510 obtains virtual viewpoint position information from a control station 310. A camera information obtaining unit 2520 obtains camera position information of each camera 112 from the control station 310. The pieces of obtained position information are sent to a selecting unit 2550.

A data obtaining unit 2530 obtains a foreground image, a background image, sound data, and metadata of these data from a front end server. The selecting unit 2550 selects the camera for which the data amount of the obtained data is to be reduced, and performs data amount reduction processing for a captured image of the selected camera.

A storage 2590 functions as a holding unit that holds data with a reduced data amount. The storage 2590 transmits corresponding data to a back end server 270 in response to a readout request from the back end server 270. The procedure of the data amount reduction processing is the same as in the third embodiment (FIG. 11) and a description thereof will be omitted.

With the above-described processing, it is possible to lighten the load at the time of data write of the database 250.

Fifth Embodiment

The third embodiment has explained the method of lightening the load when transmitting data from the front end server 230 to the database 250. The fifth embodiment will describe data amount reduction when a database 250 transmits data to a back end server 270. A system arrangement is the same as in the first embodiment and a description thereof will be omitted.

Figure 14:
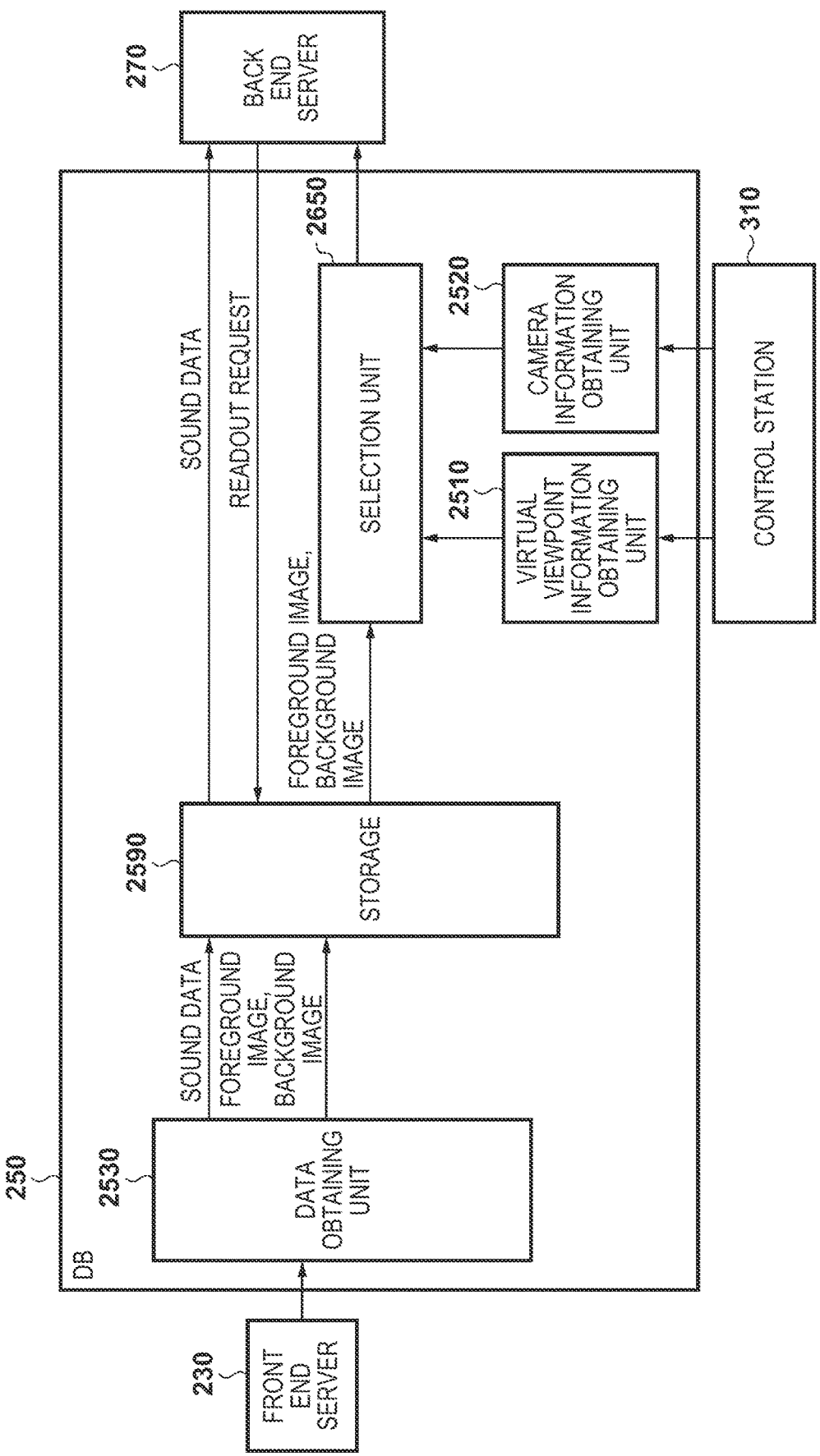
FIG. 14 is a block diagram showing an example of the arrangement of a database 250 according to the fifth embodiment.

FIG. 14 is a block diagram showing the arrangement of the database 250 according to the fifth embodiment. Blocks denoted by the same reference numerals as those in the DB 250 according to the fourth embodiment described in detail with reference to FIG. 13 have the same functions and a description thereof will be omitted.

A storage 2590 holds a foreground image, a background image, and sound data obtained from a data obtaining unit 2530. Furthermore, the storage 2590 accepts a readout request from the back end server 270, and transmits, to the selecting unit 2650, a captured image corresponding to the readout request. At this time, the sound data is transmitted to the back end server 270 directly. That is, the storage 2590 functions as a holding unit that holds a captured image and an acceptance unit that accepts a readout request.

A selecting unit 2650 selects a camera for which the data amount of the obtained data is to be reduced, and performs data amount reduction processing for a captured image of the selected camera. The selecting unit 2650 also functions as an output unit that outputs the data with the reduced data amount to the back end server 270. The procedure of the data amount reduction processing of the selecting unit 2650 is the same as in the third embodiment (FIG. 11), and a description thereof will be omitted.

With the above-described processing, it is possible to lighten the load when the database 250 transmits data to the back end server 270.

Sixth Embodiment

The fifth embodiment has explained the method of reducing the data amount when the database 250 transmits the data to the back end server 270. The sixth embodiment will describe a case in which the data amount of data designated when a back end server 270 issues a readout request to a database 250 is reduced. A system arrangement is the same as in the first embodiment and a description thereof will be omitted.

Figure 15:
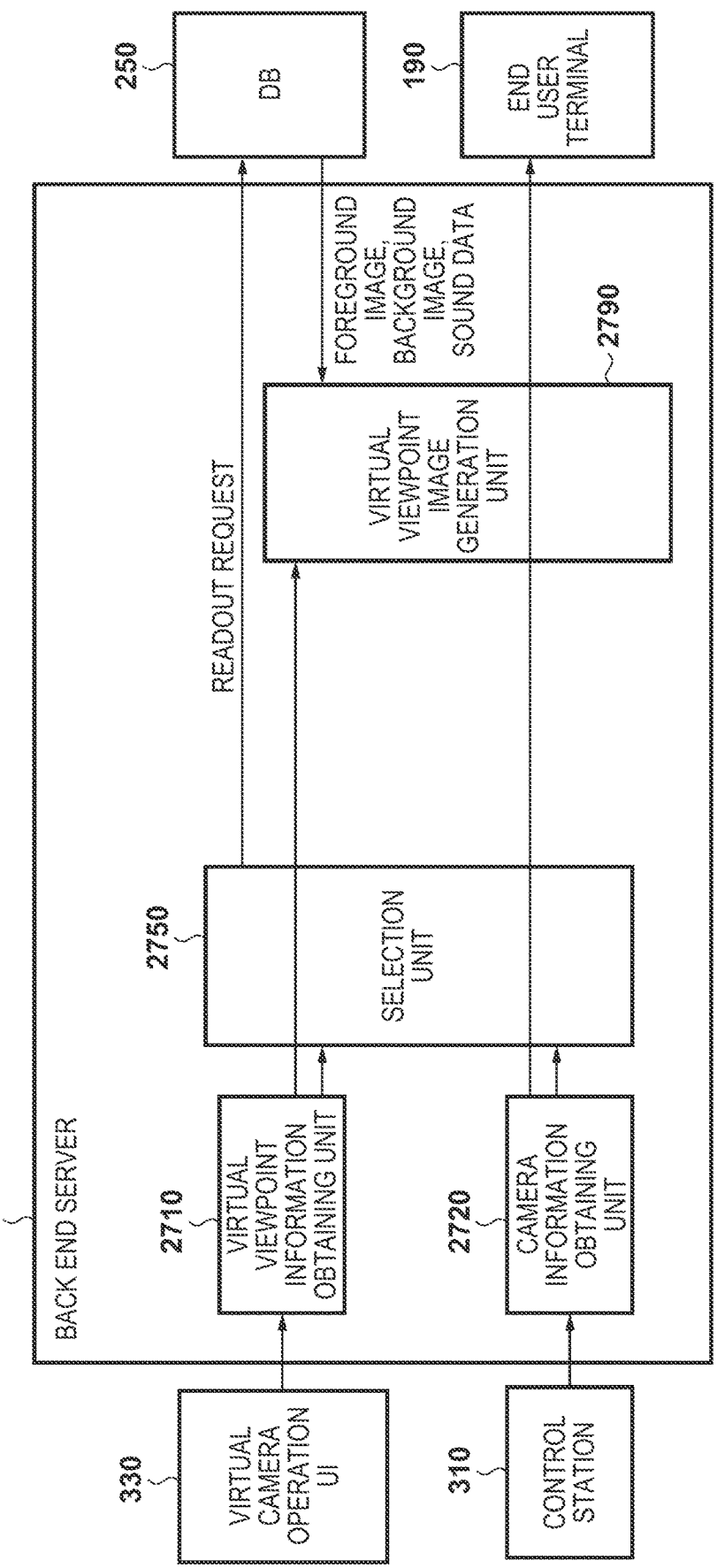
FIG. 15 is a block diagram showing an example of the arrangement of a back end server 270 according to the sixth embodiment.

FIG. 15 is a block diagram showing the arrangement of the back end server 270 according to the sixth embodiment.

A virtual viewpoint information obtaining unit 2710 obtains virtual viewpoint position information from a virtual camera operation UI 330. A camera information obtaining unit 2720 obtains camera position information of each camera 112 from a control station 310. The pieces of obtained position information are sent to a selecting unit 2750 and a virtual viewpoint image generation unit 2790.

The selecting unit 2750 functions as a request unit that issues a readout request to the database 250 by designating data to be read out. The readout request will be described in detail with reference to FIG. 16. The virtual viewpoint image generation unit 2790 functions as a generation unit that generates a virtual viewpoint image based on a designated virtual viewpoint. That is, the virtual viewpoint image generation unit 2790 renders a virtual viewpoint image based on data read out from the database 250, and transmits the generated image to an end user terminal 190.

FIG. 16 shows the procedure of readout data designation processing of the selecting unit 2750. Processes in steps S601 to S604 are the same as in the first embodiment (FIG. 6) and a description thereof will be omitted.

In step S1601, the selecting unit 2750 issues a readout request by designating frames so as to reduce a data amount to be read out by, for example, thinning frames. In step S1602, the selecting unit 2750 issues a readout request by excluding a binary image representing the silhouette shape of a foreground region. In step S1603, the selecting unit 2750 issues a readout request by excluding color information of a foreground image. In step S1604, the selecting unit 2750 issues a readout request with the unchanged data amount.

The DB 250 transmits, to the back end server 270, data of the designated contents from the stored data in response to each request.

With the above-described processing, it is possible to reduce the data amount at the time of the readout request of the database 250, and lighten the load when the database 250 transmits data to the back end server 270.

Seventh Embodiment

When performing rendering processing in a back end server 270, if the data amount of data to be rendered is large, the processing load may become heavy. Thus, the data amount may be reduced in the back end server 270. The seventh embodiment will describe the data amount reduction processing in this case. A system arrangement is the same as in the first embodiment and a description thereof will be omitted.

FIG. 17 is a block diagram showing the arrangement of the back end server 270 according to the seventh embodiment.

A virtual viewpoint information obtaining unit 2810 and a camera information obtaining unit 2820 send obtained position information of a virtual viewpoint and that of each camera 112 to a selecting unit 2850 and a virtual viewpoint image generation unit 2890.

The virtual viewpoint image generation unit 2890 functions as a request unit that issues a readout request to a database 250 based on the obtained position information of the virtual viewpoint and that of each camera 112. The database 250 outputs designated data in response to the readout request.

The selecting unit 2850 performs the same processing (FIG. 6) as in the first embodiment for the data received from the database 250, and sends the resultant data to the virtual viewpoint image generation unit 2890.

The virtual viewpoint image generation unit 2890 renders a virtual viewpoint image based on the data received from the selecting unit 2850, and transmits the image to an end user terminal 190.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234302, filed Dec. 6, 2017, which is hereby incorporated by reference herein in its entirety.

What is claimed is:
1. An information processing apparatus, comprising:
an image obtaining unit configured to obtain an image based on image capturing by an image capturing apparatus;

a first obtaining unit configured to obtain first viewpoint information about at least one of a position and an orientation of the image capturing apparatus;

a second obtaining unit configured to obtain second viewpoint information about at least one of a position and an orientation of a virtual viewpoint;

a determination unit configured to determine whether to reduce an information amount of the obtained image based on the first viewpoint information and the second viewpoint information;

a reduction unit configured to perform, in a first case where it is determined to reduce the information amount of the obtained image, specific processing on the obtained image, and not to perform, in a second case where it is determined not to reduce the information amount of the obtained image, the specific processing on the obtained image, the specific processing being processing that reduces the information amount of the obtained image; and a transmission unit configured to transmit, in the first case, the obtained image on which the specific processing has been performed and to transmit, in the second case, the obtained image on which the specific processing is not performed.

2. The apparatus according to claim 1, wherein
the first viewpoint information includes information indicating an orientation of an optical axis of the image capturing apparatus,
the second viewpoint information includes information indicating an orientation of an optical axis of the virtual viewpoint, and
the determination unit determines, based on a difference between the orientation of the optical axis of the image capturing apparatus and the orientation of the optical axis of the virtual viewpoint, whether to reduce the information amount of the obtained image.

3. The apparatus according to claim 2, wherein
the second obtaining unit obtains pieces of second viewpoint information about a plurality of virtual viewpoints, and
the determination unit determines, based on a difference between the orientation of the optical axis of the image capturing apparatus and each of orientations of optical axes of the plurality of virtual viewpoints, whether to reduce the information amount of the obtained image.

4. The apparatus according to claim 3, wherein in a case where the difference is larger than a predetermined value, the reduction unit performs the specific processing on the obtained image.

5. The apparatus according to claim 1, wherein the specific processing includes processing of reducing information about a color and/or shape of the obtained image.

6. The apparatus according to claim 1, wherein the specific processing includes processing of reducing information about an object included in the obtained image.

7. The apparatus according to claim 6, wherein the specific processing further includes processing of reducing information about a color and/or shape of the object.

8. The apparatus according to claim 1, wherein the specific processing includes processing of reducing a frame rate of the obtained image.

9. An information processing apparatus comprising:
a first obtaining unit configured to obtain information about at least one of a position and an orientation of a plurality of image capturing apparatuses that capture an object from a plurality of different directions;

a second obtaining unit configured to obtain information about at least one of a position and an orientation of a virtual viewpoint;

a reduction unit configured to perform, based on information about at least one of the position and the orientation of each of the plurality of image capturing apparatuses and at least one of the position and the orientation of the virtual viewpoint, specific processing on a captured image selected from captured images of the plurality of image capturing apparatuses, the specific processing being processing that reduces an information amount of the captured image selected from the captured images of the plurality of image capturing apparatuses; and a control unit configured to control to store, in a memory, the captured image on which the specific processing has been performed and a captured image of the captured images of the plurality of image capturing apparatuses on which the specific processing has not been performed.

10. The apparatus according to claim 9, wherein the control unit stores, in the memory of a storage device connected to the information processing apparatus, the captured image on which the specific processing has been performed and the captured image on which the specific processing has not been performed.

11. The apparatus according to claim 9, further comprising the memory
wherein the control unit stores, in the memory, the captured image on which the specific processing has been performed and the captured image on which the specific processing has not been performed.

12. A control method for an information processing, the method comprising:
obtaining an image based on image capturing by an image capturing apparatus;
obtaining first viewpoint information about at least one of a position and an orientation of the image capturing apparatus;
obtaining second viewpoint information about at least one of a position and an orientation of a virtual viewpoint;
determining whether to reduce an information amount of the obtained image based on the first viewpoint information and the second viewpoint information;
performing, in a first case where it is determined to reduce the information amount of the obtained image, specific processing on the obtained image, and not performing, in a second case where it is determined not to reduce the information amount of the obtained image, the specific processing on the obtained image, the specific processing being processing that reduces the information amount of the obtained image; and
transmitting, in the first case, the obtained image on which the specific processing has been performed and transmitting, in the second case, the obtained image on which the specific processing is not performed.

13. A control method for an information processing apparatus, comprising:
obtaining information about at least one of a position and an orientation of a plurality of image capturing apparatuses that capture an object from a plurality of different directions;
obtaining information about at least one of a position and an orientation of a virtual viewpoint;
performing, based on information about at least one of the position and the orientation of each of the plurality of image capturing apparatuses and at least one of the position and the orientation of the virtual viewpoint, specific processing on a captured image selected from captured images of the plurality of image capturing apparatuses, the specific processing being processing that reduces an information amount of the captured image selected from the captured images of the plurality of image capturing apparatuses; and storing, in a storage device, the captured image on which the specific processing has been performed and a captured image of the captured images of the plurality of image capturing apparatuses on which the specific processing has not been performed.

* * * * *